(12) United States Patent
Adachi et al.

(10) Patent No.: US 11,934,724 B2
(45) Date of Patent: Mar. 19, 2024

(54) RECORDING APPARATUS AND METHOD OF CALCULATING DENSITY IN VICINITY OF THE SAME

(71) Applicant: SEIKO EPSON CORPORATION, Tokyo (JP)

(72) Inventors: Hirohisa Adachi, Matsukawa-machi (JP); Takeru Oguchi, Chino (JP); Hiroyuki Kosuge, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/663,775

(22) Filed: May 17, 2022

(65) Prior Publication Data
US 2022/0374181 A1    Nov. 24, 2022

(30) Foreign Application Priority Data

May 19, 2021    (JP) .................................. 2021-084339

(51) Int. Cl.
*G06F 3/12*    (2006.01)
(52) U.S. Cl.
CPC .......... *G06F 3/1253* (2013.01); *G06F 3/1205* (2013.01); *G06F 3/1208* (2013.01)
(58) Field of Classification Search
CPC ..... G06F 3/1253; G06F 3/1205; G06F 3/1208
See application file for complete search history.

(56) References Cited

U.S. PATENT DOCUMENTS

| | | | | |
|---|---|---|---|---|
| 5,697,040 A | * | 12/1997 | Rabjohns | G03G 15/50 399/382 |
| 5,974,401 A | * | 10/1999 | Enomoto | G06Q 10/087 705/40 |
| 10,169,993 B1 | * | 1/2019 | Dance | G08G 1/0141 |
| 10,477,046 B2 | * | 11/2019 | Tsuchitoi | H04N 1/00511 |
| 11,082,508 B2 | * | 8/2021 | Camera | G06F 40/10 |
| 2003/0090716 A1 | * | 5/2003 | Umebayashi | H04L 41/0213 358/1.15 |
| 2009/0273805 A1 | * | 11/2009 | Nakagawa | G06F 3/1204 358/1.15 |
| 2011/0213662 A1 | * | 9/2011 | Jessen | G06Q 30/0255 705/14.66 |
| 2013/0046795 A1 | * | 2/2013 | Borgerson | G06Q 10/06 707/E17.011 |

(Continued)

FOREIGN PATENT DOCUMENTS

JP    2012-076383    4/2012

*Primary Examiner* — Helen Zong
(74) *Attorney, Agent, or Firm* — WORKMAN NYDEGGER

(57) ABSTRACT

A recording apparatus includes: a receiver receiving recording data transmitted from a user; a recording section performing recording on a medium using the recording data; a storage section temporarily storing the recording data until the recording is finished; an output tray to which the medium with the recording finished is outputted; and a controller controlling the recording apparatus. Here, when an index indicating the size of a value of the number of users predicted to congregate near the recording apparatus is a density near the recording apparatus, the controller calculates the density based on information concerning recording data stored in the storage section, and enables the density to be referred to.

18 Claims, 12 Drawing Sheets

(56) References Cited

U.S. PATENT DOCUMENTS

| | | | | |
|---|---|---|---|---|
| 2014/0010558 A1* | 1/2014 | Uwatoko | ........... | G03G 15/5079 |
| | | | | 399/18 |
| 2014/0036308 A1* | 2/2014 | Yoshioka | ........... | H04N 1/00888 |
| | | | | 358/1.15 |
| 2016/0100066 A1* | 4/2016 | Yamada | .............. | H04L 43/0817 |
| | | | | 358/1.15 |
| 2017/0341375 A1* | 11/2017 | Menezes | .............. | B41J 2/04536 |
| 2018/0103176 A1* | 4/2018 | Van Vonderen | ..... | G03G 15/556 |
| 2020/0042260 A1* | 2/2020 | Kanamoto | ............. | G06F 3/1253 |
| 2020/0137252 A1* | 4/2020 | Wada | .................... | H04N 1/0097 |
| 2022/0203617 A1* | 6/2022 | Pekic | ....................... | B29C 64/40 |
| 2022/0247874 A1* | 8/2022 | Okazaki | ............. | H04N 1/00408 |

* cited by examiner

FIG. 7

| FIRST RECORDING TIME | | FIRST ELAPSED TIME | | | |
|---|---|---|---|---|---|
| | | LESS THAN 3 MIN | LESS THAN 10 MIN | LESS THAN 30 MIN | 30 MIN OR MORE |
| | LESS THAN 1 MIN | 0.1 | 0 | 0 | 0 |
| | LESS THAN 3 MIN | 0.2 | 0.1 | 0 | 0 |
| | LESS THAN 10 MIN | 0.3 | 0.2 | 0 | 0 |
| | 10 MIN OR MORE | 0.4 | 0.3 | 0.1 | 0 |

| NUMBER OF STORED RECORDING DATA SETS | 0 DATA SETS | 0 |
|---|---|---|
| | LESS THAN 3 DATA SETS | 0.1 |
| | LESS THAN 10 DATA SETS | 0.3 |
| | 10 DATA SETS OR MORE | 0.5 |

FIG. 12

| DETECTION RESULT BY DETECTION SECTION | | SECOND ELAPSED TIME | | | |
|---|---|---|---|---|---|
| | | LESS THAN 3 MIN | LESS THAN 10 MIN | LESS THAN 30 MIN | 30 MIN OR MORE |
| | DETECTED | 0.5 | 0.3 | 0.2 | 0.1 |
| | NOT DETECTED | 0 | 0 | 0 | 0 |

| | | |
|---|---|---|
| SECOND RECORDING TIME | LESS THAN 1 MIN | 0.8 |
| | LESS THAN 3 MIN | 0.5 |
| | LESS THAN 10 MIN | 0.3 |
| | 10 MIN OR MORE | 0.1 |

FIG. 18

| THIRD RECORDING TIME | LESS THAN 1 MIN | 0.1 |
| --- | --- | --- |
| | LESS THAN 3 MIN | 0.2 |
| | LESS THAN 10 MIN | 0.3 |
| | 10 MIN OR MORE | 0.5 |

FIG. 19

| NUMBER OF RECORDINGS IN RECORDING LOG | 0 RECORDINGS | 0 |
| --- | --- | --- |
| | LESS THAN 3 RECORDINGS | 0.1 |
| | LESS THAN 10 RECORDINGS | 0.3 |
| | 10 RECORDINGS OR MORE | 0.5 |

RECORDING APPARATUS AND METHOD OF CALCULATING DENSITY IN VICINITY OF THE SAME

The present application is based on, and claims priority from JP Application Serial Number 2021-084339, filed May 19, 2021, the disclosure of which is hereby incorporated by reference herein in its entirety.

BACKGROUND

1. Technical Field

The present disclosure relates to a recording apparatus that performs recording on a medium and a method of calculating a density near the recording apparatus.

2. Related Art

An image forming apparatus described in JP-A-2012-76383 includes a print execution section that performs printing based on print data and a sheet output section that outputs print products. At the image forming apparatus, multiple print executors perform printing, and print products by multiple print executors are outputted to the sheet output section. The image forming apparatus is an example of a recording apparatus. The print data are an example of recording data. The print execution section is an example of a recording section. The sheet output section is an example of an output tray. The print executors are an example of users. The print products are an example of media with recording finished.

When recording ends, the user goes to the recording apparatus for media with the recording finished in order to pick up and bring back the media from the output tray. In this process, the user may have contact or close proximity with other users. Such contact or close proximity with other users increases the risk of infection during an epidemic.

SUMMARY

The present disclosure is a recording apparatus, including: a receiver receiving recording data transmitted from a user; a recording section performing recording on a medium using the recording data; a storage section temporarily storing the recording data until the recording is finished; an output tray to which the medium with the recording finished is outputted; and a controller controlling the recording apparatus. Here, when an index indicating the size of a value of the number of users predicted to congregate near the recording apparatus is a density near the recording apparatus, the controller calculates the density based on information concerning recording data stored in the storage section, the density and enables the density to be referred to.

The present disclosure is a recording apparatus, including: a receiver receiving recording data transmitted from a user; a recording section performing recording on a medium using the recording data; a memory section storing a recording log of the recording section; an output tray to which the medium with the recording finished is outputted; and a controller controlling the recording apparatus. Here, when an index indicating the size of a value of the number of users predicted to congregate near the recording apparatus is a density near the recording apparatus, the controller calculates, based on the recording log stored in the memory section, the density and enables the density to be referred to.

The present disclosure is a method of calculating a density near a recording apparatus including: a receiver receiving recording data transmitted from a user; a recording section performing recording on a medium using the recording data; a storage section temporarily storing the recording data until the recording is finished; an output tray to which the medium with the recording finished is outputted; and a computer calculating a density near the recording apparatus when an index indicating the size of a value of the number of users predicted to congregate near the recording apparatus is the density, the method including: causing the computer to select recording data, based on information concerning a user who transmitted the recording data; and causing the computer to calculate, based on information concerning the recording data selected, the density.

The present disclosure is a method of calculating a density near a recording apparatus including: a receiver receiving recording data transmitted from a user; a recording section performing recording on a medium using the recording data; a memory section storing a recording log of the recording section; an output tray to which the medium with the recording finished is outputted; and a computer calculating a density near the recording apparatus when an index indicating the size of a value of the number of users predicted to congregate near the recording apparatus is the density, the method including: causing the computer to select a recording log, based on a time period in the recording log when recording data was recorded; and causing the computer to calculate, based on the recording log selected, the density.

BRIEF DESCRIPTION OF THE DRAWINGS

FIG. 7 is a number-of-people table example based on a first elapsed time and a first recording time.

FIG. 12 is a number-of-people table example based on a second elapsed time.

FIG. 18 is a number-of-people table example based on a third recording time.

FIG. 19 is a number-of-people table example based on the number of recordings in recording logs.

DESCRIPTION OF EXEMPLARY EMBODIMENTS

Figure 1:
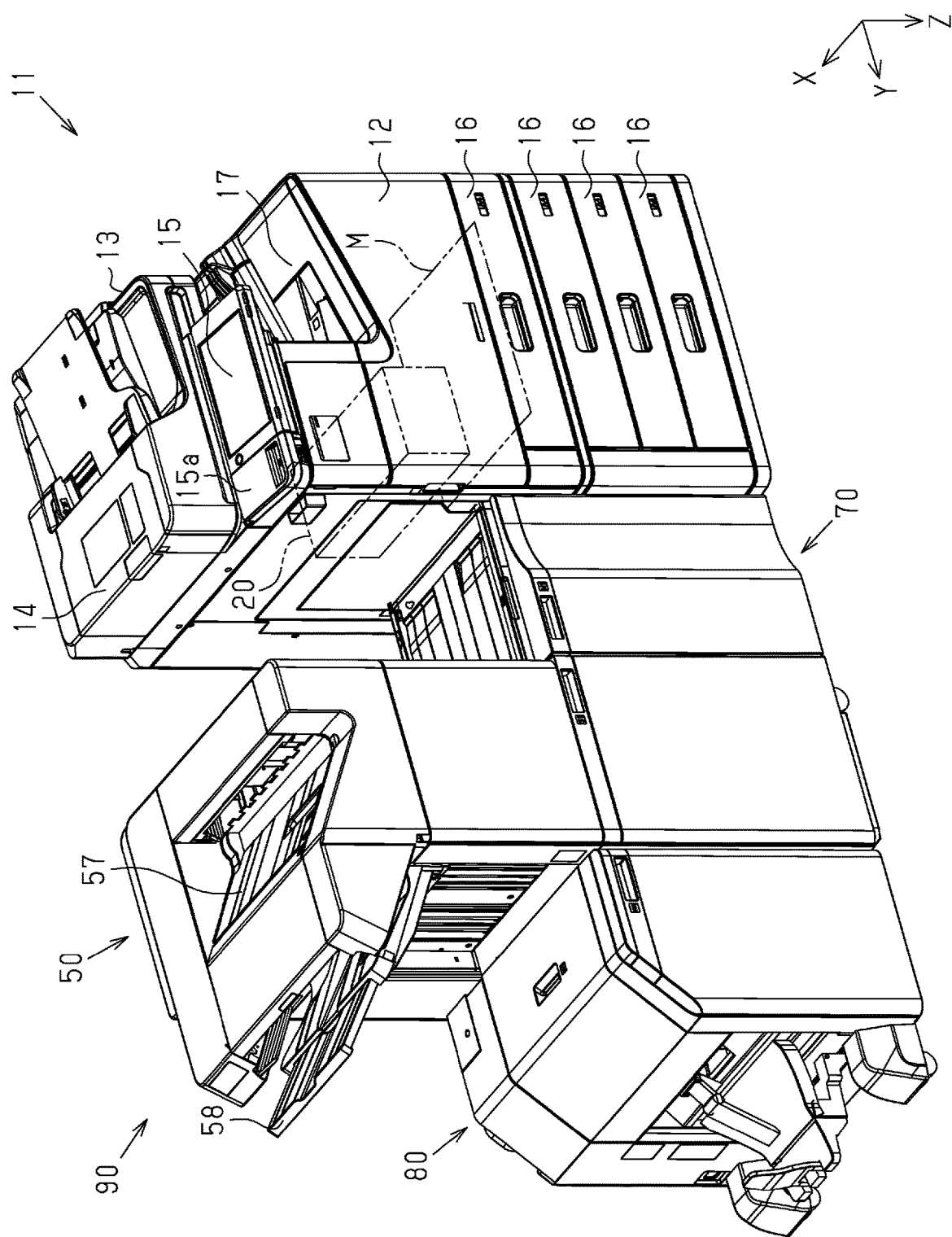
FIG. 1 is a perspective view illustrating a recording apparatus according to first and second embodiments.

Hereinafter, a recording apparatus according to first and second embodiments and a method of calculating a density near the recording apparatus will be described with reference to the drawings. The recording apparatus performs an image forming process to record characters and images on media, such as sheets of paper, by discharging ink as an example of liquid onto the media, for example.

In the drawings, the recording apparatus is assumed to be placed on a horizontal plane. The direction of gravity is indicated by a Z axis, and direction along the horizontal plane are indicated by an X axis and a Y axis. The X, Y, and Z axes are orthogonal to each other. In the following description, a direction along the X axis is also referred to as a width direction X; a direction along the Y axis, a depth direction Y; and a direction along the Z axis, a vertical direction Z.

First Embodiment

Outline of Recording Apparatus

As illustrated in FIG. 1, a recording apparatus 11 includes a recording section 20. The recording section 20 performs recording by discharging liquid. The recording section 20 performs recording on a medium M based on recording data. The recording apparatus 11 is, for example, an ink jet-type printer that discharges ink onto the medium M to print characters and images.

The recording apparatus 11 includes a main section 12, a reading section 13, and automatic feeding section 14. The main section 12 has a cuboid profile. The reading section 13 and automatic feeding section 14 are mounted over the main section 12. The recording apparatus 11 includes a structure in which the main section 12, reading section 13, and automatic feeding section 14 are stacked in this order from the bottom in the vertical direction Z.

The reading section 13 is configured to read images, such as characters and photographs, recorded on an original. The automatic feeding section 14 is configured to feed the original toward the reading section 13. The reading section 13 includes an operation section 15. The operation section 15 is operated by a user using the recording apparatus 11 to give an instruction to the recording apparatus 11. The operation section 15 includes, for example, a touch-panel liquid crystal screen or operation buttons.

The operation section 15 may include an authentication section 15a. The authentication section 15a is, for example, an IC card reader. The IC card reader reads information stored in an integrated circuit within an IC card 92 brought close to the IC card reader. When the IC card 92 is from a user of the recording apparatus 11, the authentication section 15a authenticates the IC card 92. That is, authentication enables operation at the operation section 15.

After placing an original in the automatic feeding section 14, the user gives a reading instruction to the recording apparatus 11 through the operation section 15, causing the automatic feeding section 14 to feed the placed original. The user thereby causes the reading section 13 to read the image of the original. In addition, by giving a recording instruction to the recording apparatus 11 through the operation section 15, the user causes the medium M recorded by the recording section 20 to be outputted from the main section 12.

As illustrated in FIG. 1, the main section 12 includes plural medium accommodation sections 16 configured to accommodate media M such as sheets of paper. The main section 12 of the first embodiment includes four medium accommodation sections 16 in total. The medium accommodation sections 16 are configured to be drawn out from the main section 12. The main section 12 includes a first output tray 17 as an output tray to which recorded media M are outputted. The number of medium accommodation sections 16 may be one.

Media M accommodated in each medium accommodation section 16 are transported to the first output tray 17. A not-illustrated feed roller rotates in contact with the topmost one of the plural media M accommodated in the medium accommodation section 16. The topmost medium M is thereby fed from the medium accommodation section 16 toward above the medium accommodation section 16. When the medium M passes by a not-illustrated liquid discharge head included in the recording section 20, the liquid discharge head discharges liquid onto the medium M so that the discharged liquid sticks to the medium M to implement recording. The recorded medium M is outputted from the main section 12 to the first output tray 17 by a not-illustrated output roller pair. The user can pick up the medium M from the first output tray 17 to bring back the same.

The recording apparatus 11 may include a post-processing apparatus 90. An example of the post-processing apparatus 90 may be a medium loader 50 that loads media M recorded in a collated manner and then outputs stacks of media M. The medium loader 50 may be configured to perform post-processing such as stapling to bind each stack of media M.

The recording apparatus 11 may include a transporter 70 that transports the recorded media M to the medium loader 50. That is, the main section 12 may be directly coupled to the medium loader 50 or may be coupled to the medium loader 50 via the transporter 70.

The recording apparatus 11 may include one or plural processing apparatuses different from the medium loader 50. For example, a folder 80 may be further coupled to the medium loader 50. The folder 80 may perform folding for the media M transported to the medium loader 50. The folder 80 may perform folding for the stacks of media loaded by the medium loader 50.

As illustrated in FIG. 1, the recording apparatus 11 may include plural output trays 17, 57, and 58. The medium loader 50 includes a stacker tray 58 capable of carrying a large amount of media M and a second output tray 57. In the first output tray 17 of the main section 12, media M are outputted with the recorded side down. In the second output tray 57 of the medium loader 50, media M are outputted with the recorded side up. The user can take out media M from the second output tray 57 and stacker tray 58 to bring back the same.

The first and second output trays 17 and 57 are distant from each other. The recording apparatus 11 may further include a third output tray 67 illustrated in FIG. 2. The third output tray 67 is distant from the first and second output trays 17 and 57. For example, a second transporter is coupled at the position of the folder 80 illustrated in FIG. 1.

A second medium loader may be coupled downstream of the second transporter. Media M may be outputted to the third output tray 67 included in the second medium loader.

Configuration of Recording Apparatus

Figure 2:
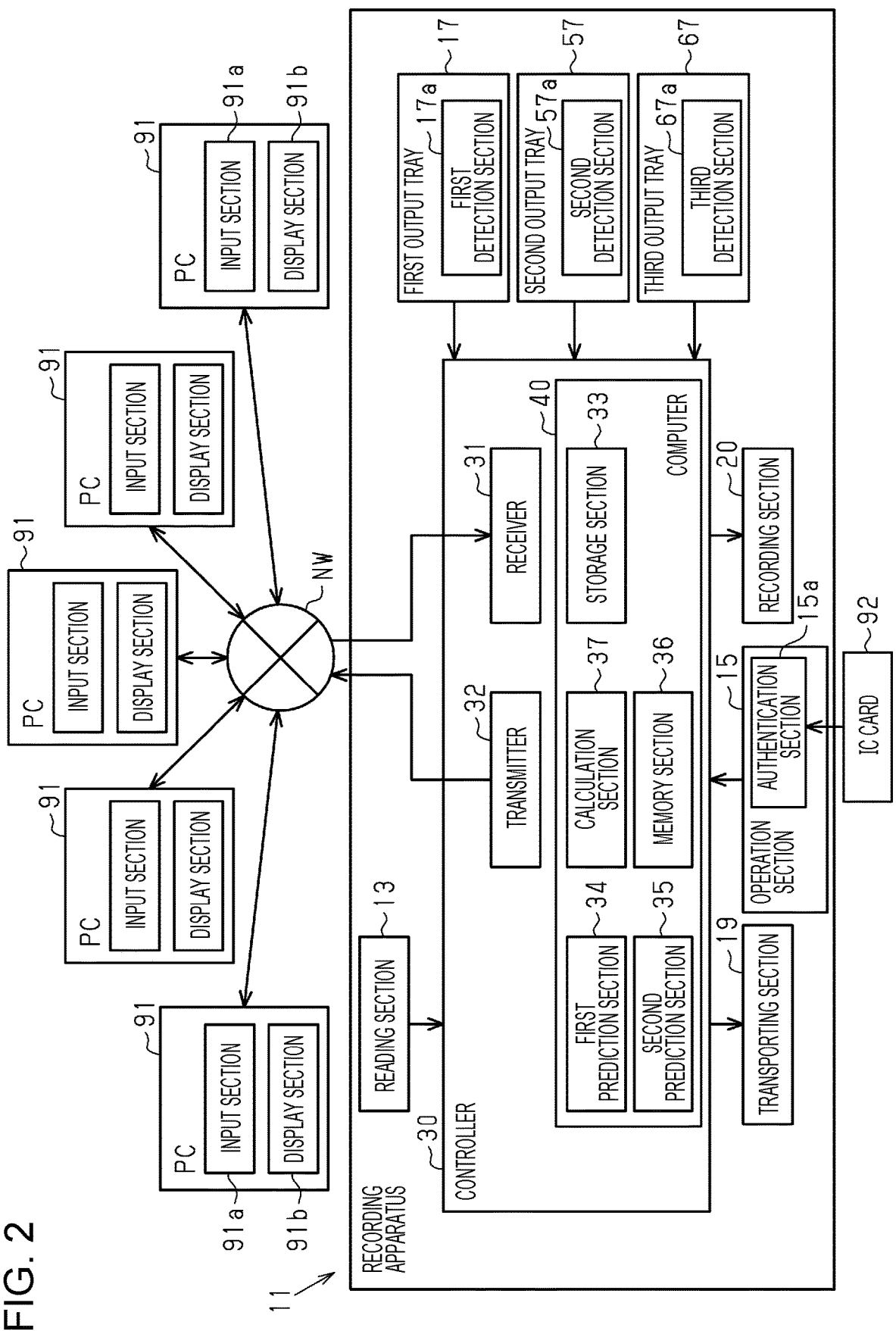
FIG. 2 is a block diagram illustrating the configuration of the recording apparatus according to the first and second embodiments.

As illustrated in FIG. 2, the recording apparatus 11 is coupled to a network NW by wire or wirelessly. The network NW is coupled to plural terminals 91 by wire or wirelessly. The terminals 91 are, for example, personal computers. Each terminal 91 includes an input section 91a and a display section 91b that are electrically coupled to the main body thereof. In the following description, personal computers are just referred to as PCs. The terminals 91 are not limited to PCs and may be mobile terminals such as tablet terminals or smart phones. The terminals 91 include a recording driver program installed. The terminals 91 thereby include a recording driver composed of software having a function to transmit recording data to the recording apparatus 11.

The recording apparatus 11 includes a controller 30 that controls the recording apparatus 11. The controller 30 includes a receiver 31 and a transmitter 32. The receiver 31 receives data transmitted via the network NW. The transmitter 32 transmits data via the network NW. The recording apparatus 11 and each terminal 91 are capable of exchanging data through the recording driver. The user operating each terminal 91 operates the input section 91a to transmit recording data to the recording apparatus 11. When the receiver 31 receives the recording data transmitted from the user operating the input section 91a, the transmitter 32 transmits response data. By receiving the response data from the recording apparatus 11, the user operating the terminal 91 can confirm whether the recording data transmitted to the recording apparatus 11 is accepted, through the display of the display section 91b.

The transmitter 32 transmits information concerning the recording apparatus 11 to each terminal 91. The recording driver may be configured so that the terminal 91 transmits recording data to the recording apparatus 11 after receiving the information concerning the recording apparatus 11 from the recording apparatus 11. For example, the recording apparatus 11 may transmit the information concerning the recording apparatus 11 to the terminal 91 when the user operating the terminal 91 selects the recording apparatus 11 illustrated in FIG. 2 as a destination of the recording data through the input section 91a. The transmitted information concerning the recording apparatus 11 may be displayed in the display section 91b, so that the user operating the terminal 91 is notified of the information. That is, the recording apparatus 11 may be configured to detect that the user intends to transmit the recording data to the recording apparatus 11. The controller 30 may transmit the information concerning the recording apparatus 11 to the terminal 91 when the user intends to transmit the recording data to the recording apparatus 11. The recording apparatus 11 may transmit the information concerning the recording apparatus 11 to the terminal 91 after the user transmits the recoding data to the recording apparatus 11.

As illustrated in FIG. 2, the controller 30 includes a computer 40. The controller 30 causes the computer 40 to calculate a later-described density near the recording apparatus 11. The computer 40 includes a storage section 33. The storage section 33 temporarily stores the recording data transmitted from users until the recording thereof is finished. When the user operating each terminal 91 transmits recording data to the recording apparatus 11, the transmitted recording data are stored in the storage section 33. At the same time as the recording data are stored in the storage section 33, information concerning the recording data are stored in the storage section 33 along with the recording data.

The information concerning the recording data includes, for example: the terminal 91 from which the recording data were transmitted; the name of the user who transmitted the recording data; the date and time at which the recording data were transmitted; and the output tray to which the recorded media M are to be outputted as recording on the media M. The information concerning the recording data includes information concerning the user who transmitted the recording data to be stored in the storage section 33. The information concerning the recording data further includes information calculated from the information concerning the recording data. For example, a first elapsed time, which is an elapsed time since the recording data were transmitted, can be calculated from the date and time at which the recording data were transmitted and the current date and time. That is, the elapsed time since the recording data were transmitted is included in the information concerning the recording data. In the following description, the "elapsed time since the recording data were transmitted" is just referred to as a "first elapsed time". The first elapsed time is included in the information concerning the recording data.

When the user who transmitted the recording data brings the user's IC card 92 close to the authentication section 15a, the IC card 92 is authenticated. The user is thereby allowed to perform an operation at the operation section 15 to give a recording instruction to the recording apparatus 11 for the recording data transmitted before. The operation section 15 is operated to record the recording data stored in the storage section 33. When the operation section 15 is operated, recording is performed for media M using the recording data. The mobile terminal of the user may serve as the IC card 92. Authentication may be also conducted by the user entering the user's ID and password at the operation section 15. When the user is authenticated, the media M immediately recorded are outputted from the main section 12 before the user's face. This prevents other users from accidentally bringing back media M of the user of interest. Once recorded, the recording data are deleted from the storage section 33.

The user operating each terminal 91 may make a recording instruction at the same time as transmitting the recording data from the terminal 91 so that the recording apparatus 11 immediately perform recording on media M. In the recording apparatus 11, recording on the media M is immediately started, and the recorded media M are outputted from the main section 12. For example, the recorded media M are outputted to the first output tray 17.

As illustrated in FIG. 2, the computer 40 includes a first prediction section 34 and a second prediction section 35. The first prediction section 34 predicts a first recording time. The first recording time is a time required to record each set of recording data. In the following description, the "time required to record each set of recording data" is just referred to as a "first recording time". The second prediction section 35 predicts a second recording time. The second recording time is a time required to finish recording being performed in the recording section 20. In the following description, the "time required to finish recording being performed in the recording section 20" is just referred to as a "second recording time".

The first prediction section 34 predicts the first recording time when the recording data are stored in the storage section 33 and stores the predicted first recording time in the storage section 33. The first recording time is included in the information concerning the recording data. The second prediction section 35 predicts the second recording time, for example, by subtracting the elapsed time during actual recording from the first recording time. For example, at the start of recording of the recording data, the first recording time is stored in the storage section 33 as the second recording time. As the recording progresses, the second prediction section 35 continuously updates the second recording time in the storage section 33. The second recording time is also included in the information concerning the recording data.

As illustrated in FIG. 2, the computer 40 includes a memory section 36 storing recording logs of the recording section 20. In the process of deleting the recording data from the storage section 33 after recording the recording data, some of the information concerning the recording data is stored in the memory section 36 as a recording log of the recording data. The information stored in the memory section 36 among the information concerning the recording data includes: the terminal 91 from which the recording data were transmitted; the name of the user who transmitted the recording data; the date and time at which the recording data were recorded on media M; the time required to record the recording data; and the output tray to which the media M were outputted.

The first and second recording times are prediction values of the time that will be required in future and are unnecessary information after the recording data are actually recorded and the time required to record the recording data are determined. The first and second recording times are the information concerning the recording data but are information not stored in the memory section 36. A third recording time which is the time actually required to record the recording data is stored in the memory section 36. The third recording time is included in the information concerning the recording data. In the following description, the "time actually required to record the recording data" is just referred to as a "third recording time".

As illustrated in FIG. 2, the computer 40 includes a calculation section 37. The controller 30 causes the calculation section 37 to calculate a density near the recording apparatus 11 based on the information concerning the recording data to be stored in the storage section 33. The density near the recording apparatus 11 is defined as an index indicating the size of the value of the number of people predicted to congregate near the recording apparatus 11. The "near the recording apparatus 11" indicates a range of not greater than 2 meter around the recording apparatus 11 in a plan view, for example. The controller 30 causes the calculation section 37 to calculate the size of the value of the number of people predicted to congregate near the recording apparatus 11. In this specification, the density near the recording apparatus 11 is also just referred to as a "density".

For example, when it is predicted that one person comes to near the recording apparatus 11 with a probability of ½, the number of people predicted to congregate near the recording apparatus 11 is 0.5. Since the value of the number of people predicted is an expectation of the number of people congregating near the recording apparatus 11, the value thereof does not need to be an integer. The density may have a value of 0.5, which is the same as the value of the number of people predicted. Alternatively, the density may have a value obtained by performing an operation, such as centuplication, for the number of people predicted. Furthermore, the value of the number of people predicted may be classified to multiple classes of the density depending on the size thereof. The multiple classes may be density. For example, the density may include three classes, first to third classes, into which the value of the number of people predicted is classified depending on the size thereof: the first class indicating high density; the second class indicating medium density; and the third class indicating low density. Thus, the density only needs to be an index indicating the size of the value of the number of people predicted to congregate near the recording apparatus 11. In the first embodiment, the number of people predicted to congregate near the recording apparatus 11 is referred to as the density. In the following description, the "number of people predicted" is just referred to as the "number of people".

The density near the recording apparatus 11 just described without description of time indicates the current density near the recording apparatus 11. The density near the recording apparatus 11 is included in the information concerning the recording apparatus 11. The method of calculating the density near the recording apparatus 11 will be described later.

As illustrated in FIG. 2, the recording apparatus 11 includes a transporting section 19 that transports media M accommodated in the medium accommodation sections 16 and outputs recorded media M from the main section 12 to the first output tray 17. The recording apparatus 11 includes a first detection section 17a as a detection section that detects a medium M on the first output tray 17 as the output tray. The first detection section 17a constantly monitors the top of the first output tray 17 and notifies the controller 30 of the detection result of a medium M. That is, the first detection section 17a can detect whether a medium M has been outputted at the first output tray 17. The first detection section 17a may be provided for the main section 12. For example, the first detection section 17a may be provided on the exterior wall surface of the main section 12 located over the first output tray 17 to detect from above the first output tray 17, the presence of a medium M on the first output tray 17.

The recording apparatus 11 may include a second detection section 57a as a detection section that detects a medium M on the second output tray 57 as the output tray. The second detection section 57a constantly monitors the top of the second output tray 57 and notifies the controller 30 of the detection result of a medium M. That is, the second detection section 57a can detect whether a medium M has been outputted at the second output tray 57.

The recording apparatus 11 may include a third detection section 67a as a detection section that detects a medium M on the third output tray 67 as the output tray. The third detection section 67a constantly monitors the top of the third output tray 67 and notifies the controller 30 of the detection result of a medium M. That is, the third detection section 67a can detect whether a medium M has been outputted at the third output tray 67. The recording apparatus 11 may further include plural output trays and detection sections that in the plural output trays, detect a medium M on the respective output trays.

Calculation Method of Density

Figure 3:
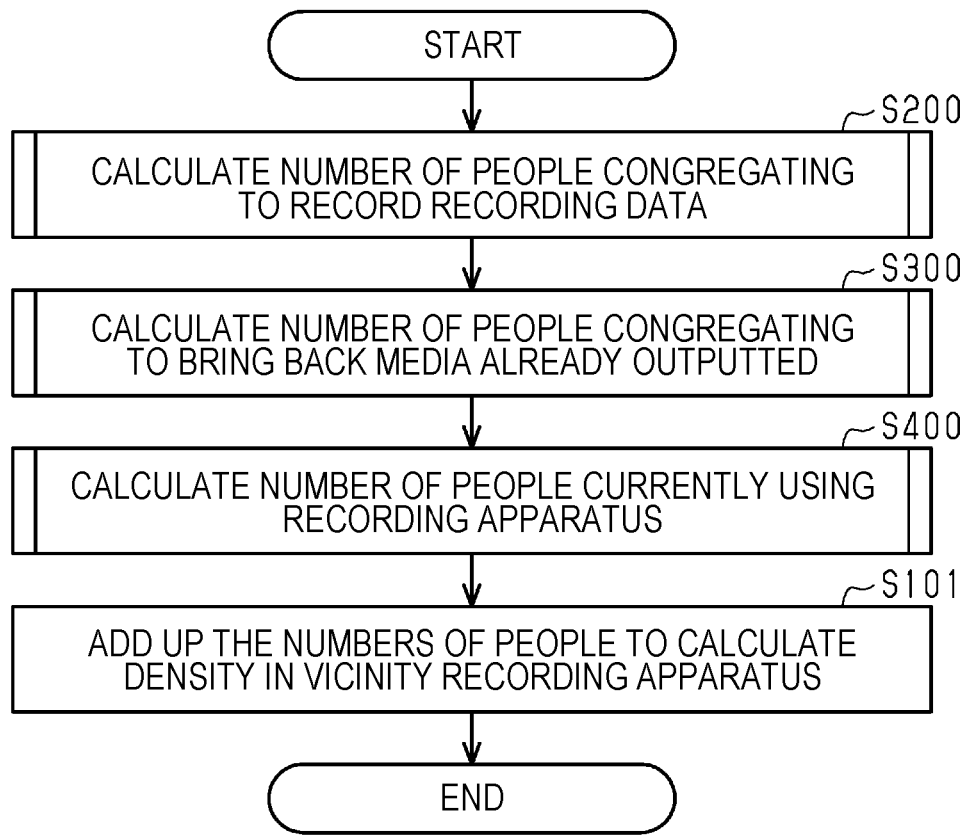
FIG. 3 is a flowchart illustrating a method of calculating a density according to the first embodiment.

As illustrated in FIG. 3, the computer 40 of the controller 30 executes a procedure of the method of calculating the density near the recording apparatus 11. First, the entire procedure of the method of calculating the density near the recording apparatus 11 will be described, and then subroutines to calculate the number of people in each step will be described.

People congregate near the recording apparatus 11 for various purposes. Some people congregate near the recording apparatus 11 to record the recording data that are transmitted from the terminal 91 and are stored in the storage section 33. Some people congregate to bring back media M already outputted from the main section 12. Furthermore, people congregate near the recording apparatus 11 to cause the reading section 13 to read an image of an original placed in the automatic feeding section 14. Some people congregate to immediately copy to media M, an original placed in the automatic feeding section 14. The controller 30 causes the calculation section 37 to add up the number of people who congregate near the recording apparatus 11 for each purpose to calculate the number of people who congregate near the recording apparatus 11. In the first embodiment, the controller 30 acquires the value of the number of people predicted to congregate near the recording apparatus 11 as the density near the recording apparatus 11.

The procedure includes a step of calculating the number of people congregating to record recording data, a step of calculating the number of people congregating to bring back media M already outputted, and a step of calculating the number of people currently using the recording apparatus 11. The procedure further includes a step of adding up these calculated numbers of people to calculate the density near the recording apparatus 11.

In step S200, the controller 30 causes the calculation section 37 to calculate the number of people congregating to record recording data. To be more specific, a subroutine is executed to calculate the number of users congregating to the recording apparatus 11 to record on media M, the recording data stored in the storage section 33 and bring back the same. When the subroutine ends, the controller 30 moves the processing to step S300.

In step S300, the controller 30 causes the calculation section 37 to calculate the number of people congregating to bring back media M already outputted. To be more specific, a subroutine is executed to calculate the number of users congregating to the recording apparatus 11 to bring back media M already outputted to the first, second, and third output trays 17, 57, and 67. When the subroutine ends, the controller 30 moves the processing to step S400.

In step S400, the controller 30 causes the calculation section 37 to calculate the number of people who are currently using the recording apparatus 11. The recording apparatus 11 may be used by users to cause the reading section 13 to read an image of an original placed in the automatic feeding section 14. The recording apparatus 11 may be used by users to immediately copy on media M, an original placed in the automatic feeding section 14. A subroutine is executed to calculate the number of users who are currently using the recording apparatus 11 for the aforementioned operations.

When the processing in step S400 ends, in step S101, the controller 30 causes the calculation section 37 to calculate the density near the recording apparatus 11. The density near the recording apparatus 11 is calculated by adding up the number of people congregating to record recording data, the number of people congregating to bring back media M already outputted, and the number of people currently using the recording apparatus 11. When the density calculated, the procedure is terminated.

The procedure is repeatedly executed by the controller 30. For example, the number of people calculated in step S200 is based on the information concerning the recording data. The procedure is therefore executed each time at least one piece of information among the information concerning the recording data is updated. Furthermore, the procedure is executed when new recording data are stored in the storage section 33 or when recording data are deleted from the storage section 33 after recorded. That is, the density near the recording apparatus 11 is continuously updated to the latest figure by the controller 30.

The controller 30 calculates the density based on the information concerning the recording data to be stored in the storage section 33 and enables the calculated density to be referred to from users. For example, the recording apparatus 11 may be configured so that the information concerning the recording apparatus 11 be accessible from the terminals 91 through the recoding driver. Each user can thereby refer to the density near the recording apparatus 11 through the display section 91b. The recording apparatus 11 may be configured so as to detect whether each user intends to transmit recording data to the recording apparatus 11. The controller 30 may notify a user of the current density when the user intends to transmit recording data to the recording apparatus 11.

The procedure does not need to include step S200 of calculating the number of people congregating to record recording data. That is, the procedure may be composed of steps S300, S400, and S101. For example, the operation section 15 does not include the authentication section 15a. When the user operating a terminal 91 transmits recording data from the terminal 91 and simultaneously makes a recording instruction, recording on media M is immediately started, and the recorded media M are outputted from the main section 12. At the recording apparatus 11, therefore, people congregate to use the recording apparatus 11 and to bring back media M already outputted.

The procedure does not need to include step S300 of calculating the number of people congregating to bring back media M already outputted. That is, the procedure may be composed of steps S200, S400, and S101. For example, the recording apparatus 11 may be configured so that recorded media M are outputted from the main section 12 only under a recording instruction made at the authentication section 15a but are not outputted under a recording instruction made at the same time as the recording data are transmitted from a terminal 91. At the recording apparatus 11, therefore, people congregate to record recording data and to use the recording apparatus 11.

The procedure does not need to include step S400 of calculating the number of people currently using the recording apparatus 11. That is, the procedure may be composed of steps S200, S300, and S101. For example, the recording apparatus 11 does not include the reading section 13 and automatic feeding section 14. At the recording apparatus 11, therefore, people congregate to record recording data and to bring back media M already outputted.

The procedure may be composed of steps S200 and S101. The procedure may be composed of steps S300 and S101. The procedure may be composed of steps S400 and S101.

Calculation of Number of People Congregating to Record Recording Data

Figure 4:
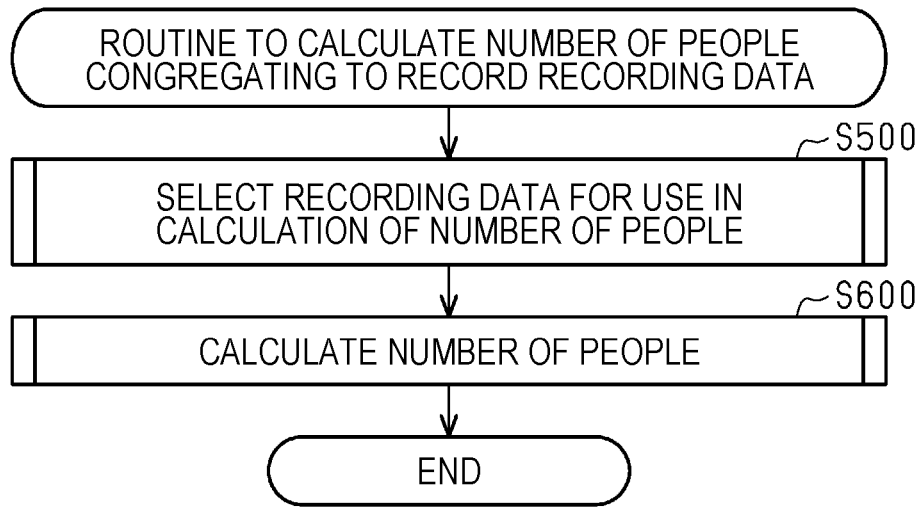
FIG. 4 is a subroutine illustrating a method of calculating the number of people congregating to record recording data.

As illustrated in FIG. 4, the computer 40 of the controller 30 executes a subroutine to calculate the number of people congregating to record recording data. The subroutine includes: a step of selecting recording data based on information concerning users who transmitted recording data; and a step of calculating the size of the value of the number of people congregating to record recording data based on the information concerning the selected recording data.

In step S500, the computer 40 of the controller 30 executes a subroutine to select recording data for use in calculation of the number of people. The subroutine is a step in which recording data are selected based on information concerning users who transmitted the recording data. When the subroutine ends, the controller 30 moves the processing to step S600.

In step S600, the computer 40 of the controller 30 executes a subroutine to calculate the number of people. This subroutine is a step in which the number of people congregating to record recoding data is calculated based on information concerning the selected recording data. In other words, the subroutine is a step in which the density is calculated based on the information concerning the selected recoding data. When this subroutine ends, the controller 30 terminates the subroutine to calculate the number of people congregating to record recording data.

Figure 5:
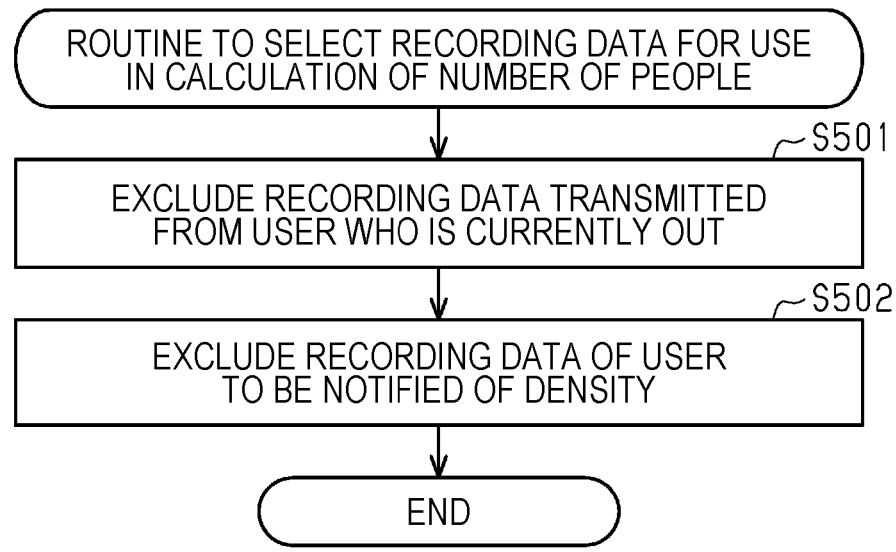
FIG. 5 is a subroutine illustrating a method of selecting data for use in calculation of the number of people.

As illustrated in FIG. 5, the computer 40 of the controller 30 executes a subroutine to select sets of recording data for use in calculation of the number of people congregating to record recording data. This subroutine is a step in which sets of recording data are selected based on information concerning the users who transmitted the sets of recording data. The controller 30 selects sets of recording data for use in calculation of the number of people congregating to record recording data, based on information concerning the users who transmitted the sets of recording data. In other words, in the procedure to calculate the density near the recording apparatus 11, the controller 30 selects sets of recording data for use in calculation of the density near the recording apparatus 11, based on information concerning the users who transmitted the sets of recording data.

In step S501, the controller 30 excludes a set of recording data that was transmitted by a user who is currently out. That is, the sets of recording data other than the set of recording data transmitted by the user who is currently out are selected. Even when the recording data are stored in the storage section 33, people do not always come to record recording data immediately. For example, when recording data are transmitted from a mobile terminal by a user at a distant location, the recording data may not be recorded immediately. The recording data may be then recorded at the recording apparatus 11 when the user comes back from the distant location. That is, the recording data for use in calculation may be selected based on the position information of the mobile terminals of users who transmitted the recording data. For example, when a user who transmitted recording data is scheduled to be out all the day, the recording data will not be recorded on that day although the recording data are stored in the storage section 33. That is, the recording data for use in calculation may be selected based on the information whether each user who transmitted the recording data is scheduled to be out all the day. The position information of the mobile terminals of users who transmitted the recording data and the information whether each user who transmitted the recording data is scheduled to be out all the day are examples of the information concerning the users who transmitted the recording data to be stored in the storage section 33. When the processing in step S501 ends, the controller 30 moves to processing in step S502.

In step S502, the controller 30 excludes a set of recording data of the user who is to be notified of the density. That is, the sets of recording data other than the set of recording data of the user to be notified of the density are selected. The sets of recoding data for use in calculation of the number of people congregating to record recording data may vary from user to user. Only the user having stored recording data in the storage section 33 comes to the recording apparatus 11 to record the recording data. The controller 30 therefore selects the sets of recording data other than the set of recording data stored in the storage section 33 by the user to be notified of the density. That is, the controller 30 calculates the density that can be referred to from each user based on the information concerning the sets of recording data other than the set of recording data of the user of interest. When the processing in step S502 ends, the controller 30 terminates the subroutine.

Figure 6:
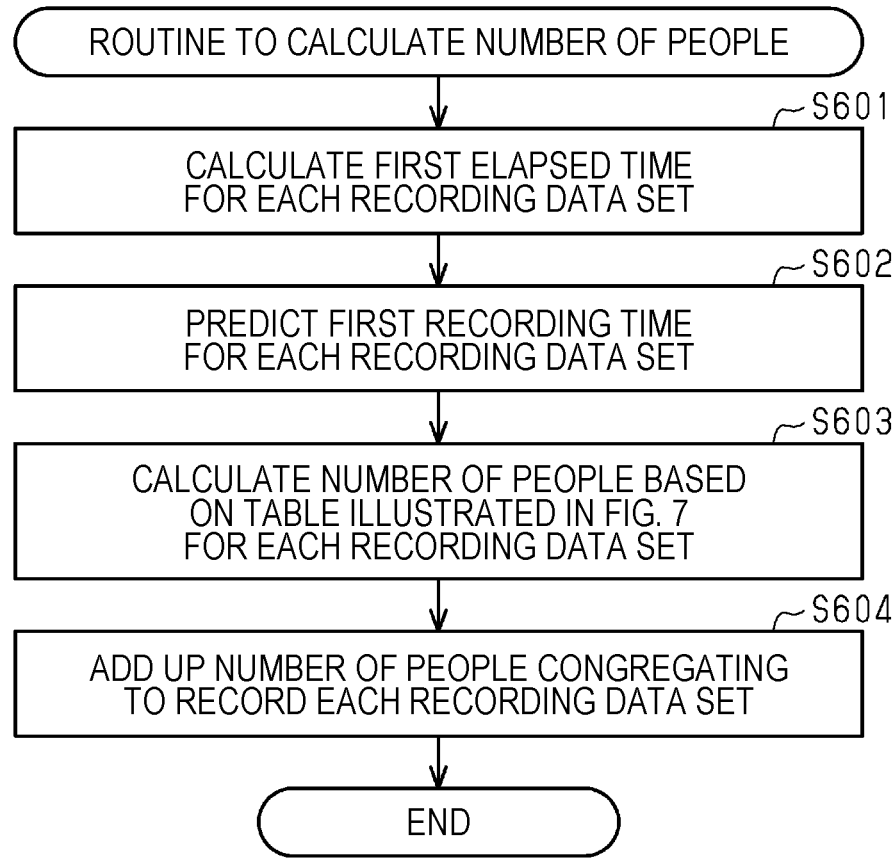
FIG. 6 is a subroutine illustrating a method of calculating the number of people.

As illustrated in FIG. 6, the computer 40 of the controller 30 executes a subroutine to calculate the number of people congregating to record recording data. The controller 30 causes the calculation section 37 to predict the number of people congregating to record each set of recording data selected in the subroutine illustrated in FIG. 5 and add the predicted number of people for each set of recording data to calculate the number of people congregating to record recording data. The subroutine illustrated in FIG. 6 is a step in which the density is calculated based on the information concerning the selected recording data.

In step S601, the controller 30 causes the calculation section 37 to calculate the first elapsed time for each set of recording data selected. The first elapsed time is calculated from the date and time at which the set of recoding data was transmitted and the current date and time. When the processing in step S601 ends, the controller 30 moves to processing in step S602.

In step S602, the controller 30 causes the first prediction section 34 to predict the first recording time for each set of recording data selected. For example, the first prediction section 34 predicts the first recording time from, for example, the record density at the recording of the set of recording data, the size of media M, which to perform dual- or one-side recording, and the like. The first recording time is included in the information concerning the set of recording data. The first recording time may be an approximate value and, for example, may be predicted in minutes. When the processing in step S602 ends, the controller 30 moves to processing in step S603.

In step S603, the controller 30 causes the calculation section 37 to calculate the number of people for each set of recording data in accordance with a number-of-people table based on the first elapsed time and first recording time. The table illustrated in FIG. 7 is an example of the number-of-people table based on the first elapsed time and first recording time. When the processing in step S603 ends, the controller 30 moves to processing in step S604.

In step S604, the controller 30 adds up the number of people congregating to record each set of recording data. The resultant value is the number of people congregating to the recording apparatus 11 to record recording data.

As illustrated in FIG. 7, the number of people congregating to the recording apparatus 11 to record recording data is calculated based on the first elapsed time. In addition, the number of people congregating to the recording apparatus 11 to record recording data is calculated based on the first recording time. The values in the table illustrated in FIG. 7 are just examples and may be properly set. The time segments may be properly set. A calculating formula that produces the number of people congregating to the recording apparatus 11 to record recording data may be used when the first elapsed time and first recording time are assigned thereto.

The values in the table illustrated in FIG. 7 may be adjusted in accordance with information concerning each user who transmitted the recording data. That is, the controller 30 may adjust the values in the table based on the first elapsed time and first recording time in such a manner to calculate the density based on the information concerning the users who transmitted the recording data. For example, for recording data of users who are likely to congregate to the recording apparatus 11 immediately after transmitting the recording data, the values in the table illustrated in FIG. 7 may be adjusted so that the number of people have larger values when the first elapsed time is shorter. For example, the users who are likely to congregate to the recording apparatus 11 immediately after transmitting recording data can be identified by analyzing recording logs for several days.

The longer the first elapsed time, the less likely people are to congregate to the recording apparatus 11 to record the recording data. The longer the first elapsed time, therefore, the smaller the values of the number of people therefore may be set. The longer the first recording time, the longer people stay near the recording apparatus 11 to record the recording data. The longer the first recording time, therefore, the larger the values of the number of people may be set.

Figures 8, 9:
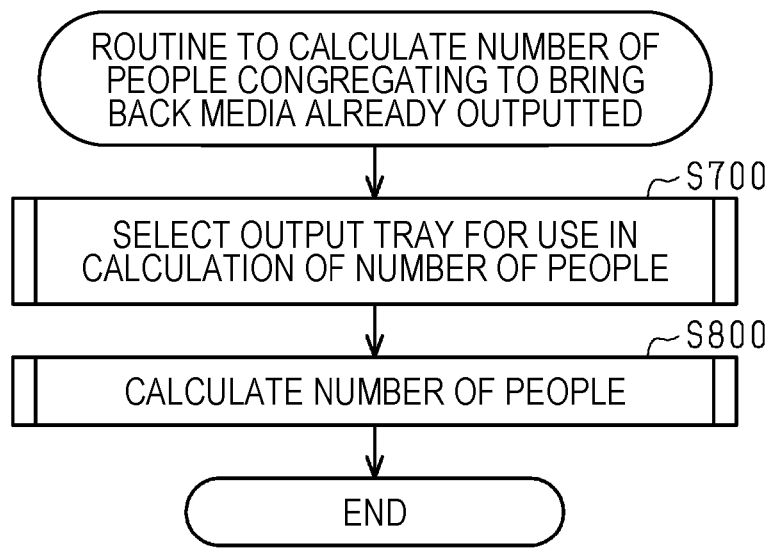
FIG. 8 is a number-of-people table example based on the number of sets of recording data stored.
FIG. 9 is a subroutine illustrating a method of calculating the number of people congregating to bring back media already outputted.

As illustrated in FIG. 8, the number of people congregating to the recording apparatus 11 to record recording data may be calculated based on the number of sets of recording data stored in the storage section 33, instead of the first elapsed time and first recording time. In other words, in the procedure to calculate the density near the recording apparatus 11, the controller 30 may calculate the density based on the number of sets of recording data stored in the storage section 33. The values in the table illustrated in FIG. 8 are just examples and may be properly set. In addition, the number of people congregating to the recording apparatus 11 to record recording data may be calculated based on the number of users who transmitted recording data to be stored in the storage section 33. In other words, in the procedure to calculate the density near the recording apparatus 11, the controller 30 may calculate the density based on the number of users who transmitted recording data to be stored in the storage section 33.

Calculation of Number of People Congregating to Bring Back Medium Already Outputted As illustrated in FIG. 9, the computer 40 of the controller 30 executes a subroutine to calculate the number of people congregating to bring back media M already outputted. This subroutine includes a step in which output trays for use in calculation of the number of people are selected based on the information concerning users who transmitted the recording data of media M outputted at the output trays 17, 57, and 67. This subroutine further includes a step in which the number of people congregating to bring back media M already outputted is calculated based on the information concerning the media M outputted at the selected output tray.

In step S700, the controller 30 executes a subroutine to select an output tray for use in calculation of the number of people. This subroutine is a step in which an output tray for use in calculation of the number of people is selected based on information concerning the user who transmitted the recording data of the media M outputted at the output trays 17, 57, or 67. The recording apparatus 11 illustrated in FIG. 2 includes the three output trays 17, 57, and 67. The three output trays are the first output tray 17, the second output tray 57, and the third output tray 67. In step S700, the controller 30 selects one or plural output trays from the first output tray 17, the second output tray 57, and the third output tray 67. The controller 30 may select all of the first output tray 17, the second output tray 57, and the third output tray 67. When this subroutine ends, the controller 30 moves the processing to step S800.

In step S800, the controller 30 executes a subroutine to calculate the number of people. This subroutine is a step in which the number of people congregating to bring back media M already outputted is calculated based on the information concerning the media M outputted at the selected output tray. When this subroutine ends, the controller 30 terminates the subroutine to calculate the number of people congregating to bring back media M already outputted.

Figure 10:
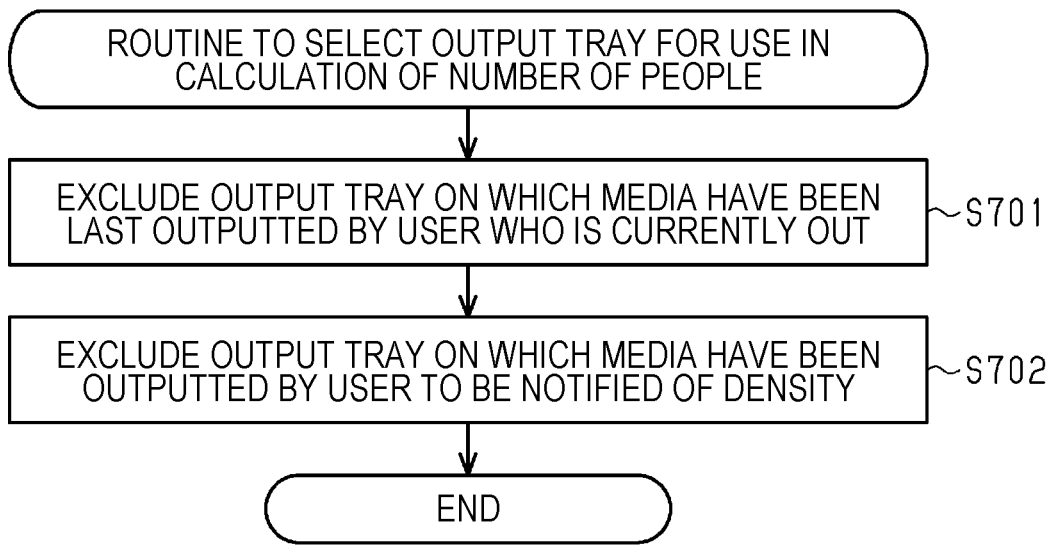
FIG. 10 is a subroutine illustrating a method of selecting an output tray for use in calculation of the number of people.

As illustrated in FIG. 10, the computer 40 of the controller 30 executes a subroutine to select an output tray for use in calculation of the number of people congregating to bring back media M already outputted. The controller 30 selects an output tray for use in calculation of the number of people congregating to bring back media M already outputted, based on information concerning the users who transmitted the recording data of the media M outputted at the selected output tray. In other words, in the procedure to calculate the density near the recording apparatus 11, the controller 30 selects recording data for use in calculation of the density near the recording apparatus 11 based on the information concerning the users who transmitted the selected recording data.

In step S701, the controller 30 excludes an output tray on which media M have been outputted by a user currently out. That is, the controller 30 selects the output trays other than the output tray on which the media M have been outputted by the user currently out. Even when the media M have been outputted at an output tray, people do not always come to bring back the outputted media M. For example, when a user is out of an office where the recording apparatus 11 is located, the outputted media M will not be brought back immediately and will be brought back after the user comes back to the office. For example, each output tray for use in calculation of the number of people may be selected based on the position information of the mobile terminal of the user who transmitted the recording data of the media M outputted at the output tray. For example, when the user who transmitted the recording data of the media M is scheduled to be out all day, the media M will not be brought back on that day. That is, the output trays for use in calculation of the number of people may be selected based on the information whether the user who transmitted the recording data of the media M outputted at each output tray is scheduled to be out all day. The position information of the mobile terminal of the user who transmitted the recording data and the information whether the user who transmitted the recording data is scheduled to be out all day are examples of the information concerning the users who transmitted recording data of the media M outputted at the output trays. When the processing in step S701 ends, the controller 30 moves to processing in step S702.

In step S702, the controller 30 excludes an output tray on which media M have been outputted by a user who is to be notified of the density. That is, the output trays other than the output tray on which media M have been outputted by the user to be notified of the density are selected. The output trays for use in calculation of the number of people congregating to bring back media M already outputted may vary among the users to be notified of the calculated density near the recording apparatus 11. Since only the user who has outputted the media M to an output tray comes to the recording apparatus 11 to bring back the media M, the controller 30 selects the output trays other than the output tray on which the media M have been outputted by the user to be notified of the density. When the processing in step S702 ends, the controller 30 terminates the subroutine.

Figure 11:
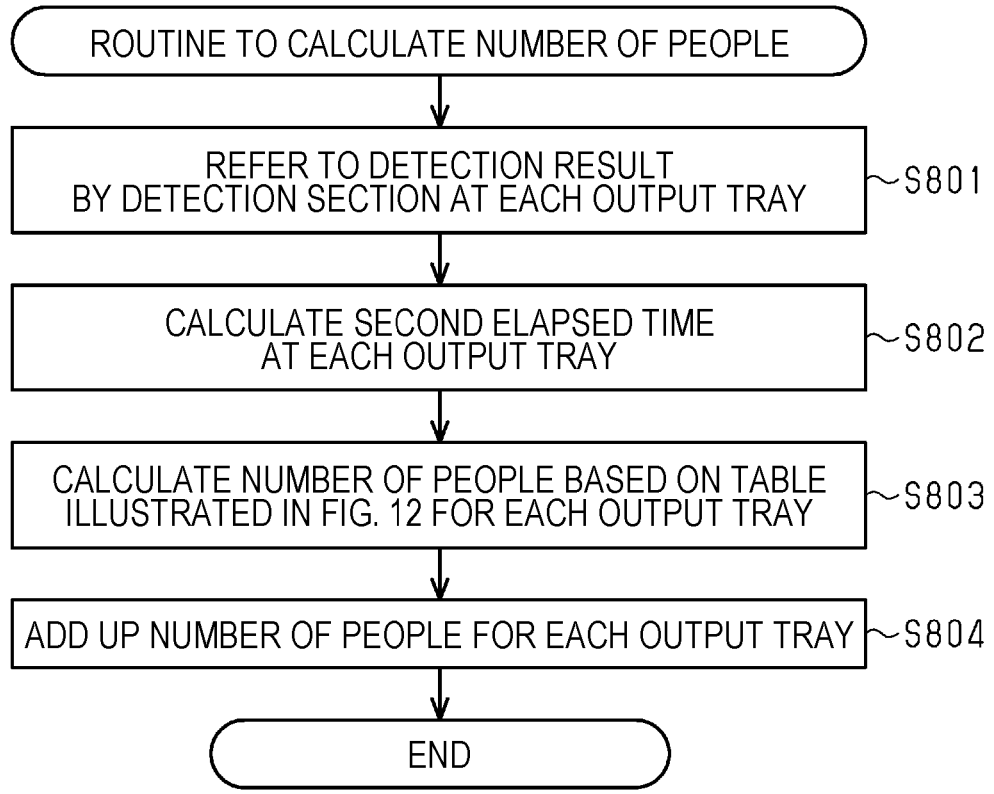
FIG. 11 is a subroutine illustrating a method of calculating the number of people.

As illustrated in FIG. 11, the computer 40 of the controller 30 executes a subroutine to calculate the number of people congregating to bring back media M already outputted. For each of the output trays selected in the subroutine illustrated in FIG. 10, the controller 30 predicts the number of people congregating to bring back the media M outputted at the output tray. The controller 30 causes the calculation section 37 to add up the predicted number of people for each output tray to calculate the number of people congregating to bring back media M already outputted.

In step S801, the controller 30 refers to the detection results by the detection sections 17a, 57a, or 67a provided for the selected output trays 17, 57, or 67. The detection results by the detection sections 17a, 57a, or 67a are included in information concerning the media M outputted at the selected output trays 17, 57, or 67, respectively. When the processing in step S801 ends, the controller 30 moves to processing in step S802.

In step S802, the controller 30 causes the calculation section 37 to calculate, for each of the selected output trays, the second elapsed time which is an elapsed time since the media M were outputted to the output tray. In the following description, the "elapsed time since media M were outputted to the output tray" is just referred to as the "second elapsed time". The second elapsed time is calculated from the date and time at which the media M were outputted to the output tray and the current date and time. When the processing in step S802 ends, the controller 30 moves to processing in step S803.

In step S803, the controller 30 causes the calculation section 37 to calculate the number of people for each output tray, in accordance with a number-of-people table based on the second elapsed time. The table illustrated in FIG. 12 is an example of the number-of-people table based on the second elapsed time. When the processing in step S803 ends, the controller 30 moves to processing in step S804.

In step S804, the controller 30 adds up the number of people congregating to bring back the media M outputted at each output tray. The resultant is the number of people congregating to the recording apparatus 11 to bring back media M already outputted.

As illustrated in FIG. 12, the number of people congregating to the recording apparatus 11 to bring back media M already outputted is calculated based on the detection results by the detection sections 17a, 57a, and 67a. In other word, in the procedure to calculate the density near the recording apparatus 11, the controller 30 calculates the density near the recording apparatus 11 based on the detection results of media M by the detection sections 17a, 57a, and 67a. The number of people congregating to the recording apparatus 11 to bring back media M already outputted is calculated based on the second elapsed time. In other words, in the procedure to calculate the density near the recording apparatus 11, the controller 30 calculates the density near the recording apparatus 11 based on the second elapsed time. The second elapsed time is an elapsed time since the media M were outputted to the output trays 17, 57, and 67. The values in the table illustrated in FIG. 12 are just examples and may be properly set. The time segments may be also properly set. A calculating formula that produces the number of people congregating to the recording apparatus 11 to bring back media M already outputted may be used when the second elapsed time and values of the detection results by the detection sections 17a, 57a, and 67a are assigned thereto. As for each value of the detection results by the detection sections 17a, 57a, and 67a, for example, the value is set to 1 when a medium M is detected and is set to 0 when any medium M is not detected.

The longer the second elapsed time, the less likely people are to congregate to the recording apparatus 11 to bring back the media M already outputted. The longer the second elapsed time, therefore, the smaller the values of the number of people may be set. For example, there is a case that users are busy with another work and have forgot storing the recording data in the storage section 33. The value of the number of people congregating to the recording apparatus 11 to bring back media M already outputted may be set to zero when any medium M is not detected because the sensors used in the detection sections 17a, 57a, and 67a are very sensitive.

Calculation of Number of People Currently Using Recording Apparatus

Figure 13:
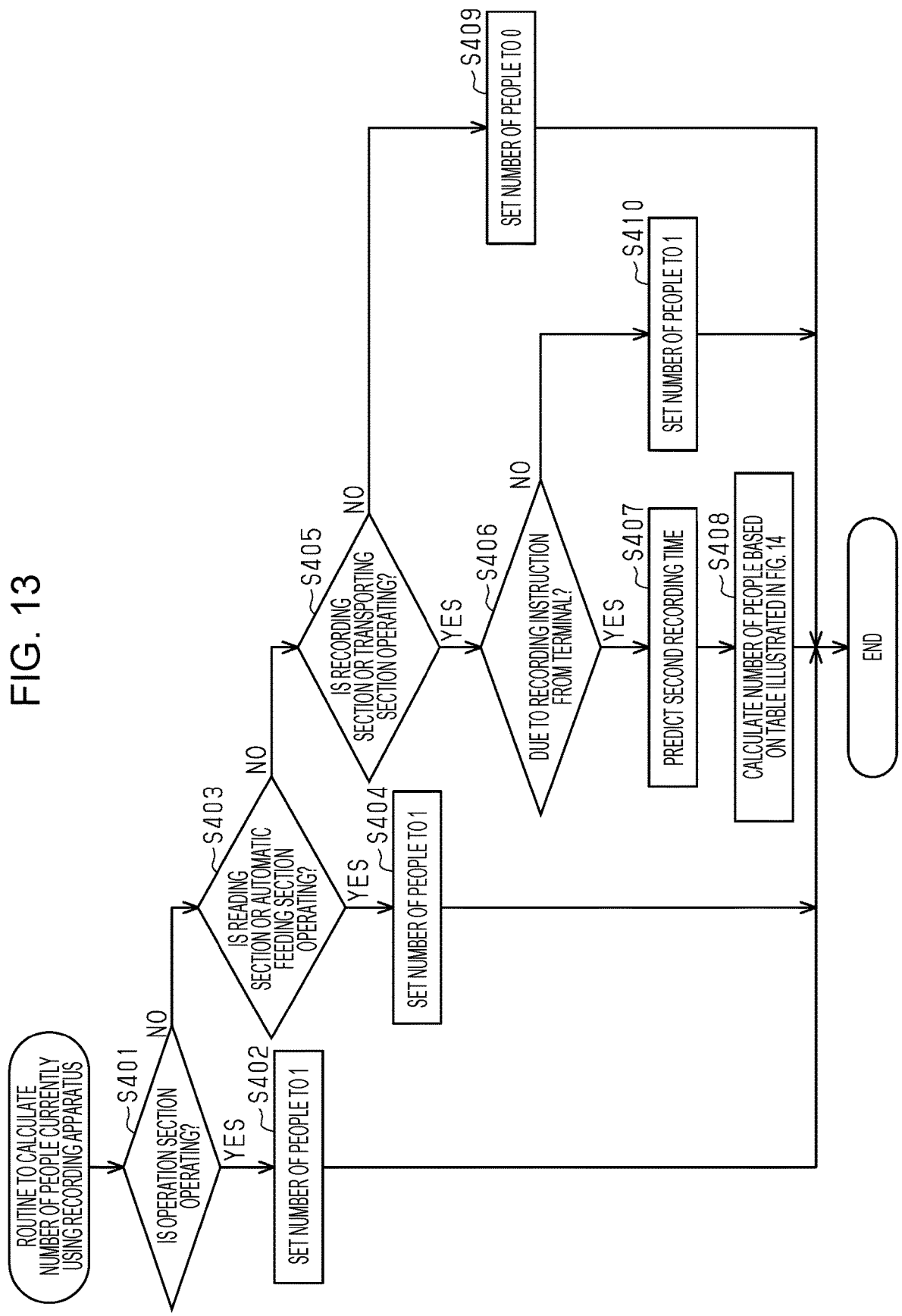
FIG. 13 is a subroutine illustrating a method of calculating the number of people currently using the recording apparatus.

As illustrated in FIG. 13, the computer 40 of the controller 30 executes a subroutine to calculate the number of people who are currently using the recording apparatus 11. This subroutine includes a step in which for each component of the recording apparatus 11, the number of people currently using the recording apparatus 11 is calculated based on whether the component is operating. In the first embodiment, examples of the components of the recording apparatus 11 are the operation section 15, reading section 13, and recording section 20. The subroutine may include a step in which the number of people currently using the recording apparatus 11 is calculated based on whether the post-processing apparatus 90, including the medium loader 50 and the folder 80, is operating.

In step S401, the controller 30 determines whether the operation section 15 is operating. When the operation section 15 is operating, the result of step S401 is YES, and the controller 30 moves the processing to step S402. When the operation section 15 is not operating, the result of step S401 is NO, and the controller 30 moves the processing to step S403.

In step S402, the controller 30 sets the number of people currently using the recording apparatus 11 to 1. In other words, in the procedure to calculate the density near the recording apparatus 11, the controller 30 calculates the density near the recording apparatus 11 based on the operation status of the operation section 15. When the value of the number of people currently using the recording apparatus 11 is 1, the recording apparatus 11 is in the situation where the operation section 15 is being used by a single user. The controller 30 terminates this subroutine.

In step S403, the controller 30 determines whether one of the reading section 13 and automatic feeding section 14 is operating. When the reading section 13 or automatic feeding section 14 is operating, the result of step S403 is YES, and the controller 30 moves the processing to step S404. When neither the reading section 13 nor automatic feeding section 14 is operating, the result of step S403 is NO, and the controller 30 moves the processing to step S405.

In step S404, the controller 30 sets the number of people currently using the recording apparatus 11 to 1. In other words, in the procedure to calculate the density near the recording apparatus 11, the controller 30 calculates the density near the recording apparatus 11 based on the operation status of the reading section 13 or automatic feeding section 14. When the value of the number of people currently using the recording apparatus 11 is 1, the recording apparatus 11 is in the situation where the reading section 13 or automatic feeding section 14 is being used by a single user. For example, reading of an image including characters or photographs recorded on an original is being done by a single user. The controller 30 terminates this subroutine.

In step S405, the controller 30 determines whether one of the recording section 20 and transporting section 19 is operating. When the recording section 20 or transporting section 19 is operating, the result of step S405 is YES, and the controller 30 moves the processing to step S406. When neither the recording section 20 nor transporting section 19 is operating, the result of step S405 is NO, and the controller 30 moves the processing to step S409.

In step S409, the controller 30 sets the number of people currently using the recording apparatus 11 to 0. That is, none of the components of the recording apparatus 11 is operating, and the number of people currently using the recording apparatus 11 is zero. The controller 30 terminates this subroutine.

In step S406, when the recording section 20 or transporting section 19 is operating, the controller 30 determines whether the recording apparatus 11 is operating under a recording instruction from any terminal 91. When the recording apparatus 11 is operating under a recording instruction from any terminal 91, the result of step S406 is YES, and the controller 30 moves the processing to step S407. When the recording apparatus 11 is operating under a recording instruction from the operation section 15 or authentication section 15a, the result of step S406 is NO, and the controller 30 moves the processing to step S410.

In step S410, the controller 30 sets the number of people currently using the recording apparatus 11 to 1. That is, the person who caused the recording apparatus 11 to start recording through the operation section 15 or authentication section 15a is waiting for the recording to end. The number of people currently using the recording apparatus 11 is therefore one. The controller 30 terminates this subroutine.

In step S407, the controller 30 causes the first prediction section 34 to predict the second recording time for the recording data being currently recorded. The second recording time is included in the information concerning the recording data. When the processing in step S407 ends, the controller 30 moves to processing in step S408.

Figures 14, 15:
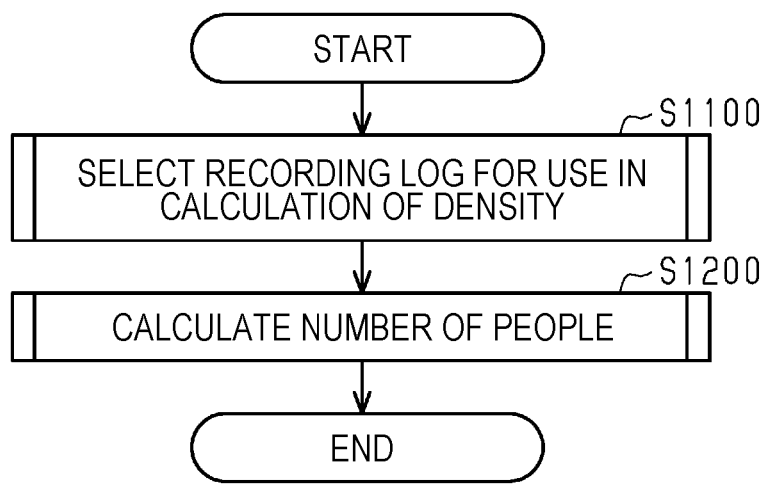
FIG. 14 is a number-of-people table example based on a second recording time.
FIG. 15 is a flowchart illustrating a method of calculating the density in a second embodiment.

In step S408, the controller 30 causes the calculation section 37 to calculate the number of people currently using the recording apparatus 11 in accordance with a number-of-people table based on the second recording time. The table illustrated in FIG. 14 is an example of the number-of-people table based on the second recording time. For example, at the start of the recording of recording data, the first recording time is stored in the storage section 33 as the second recording time. As the recording progresses, the second prediction section 35 subtracts the time elapsed during the recording from the first recording time. That is, the second prediction section 35 continuously updates the second recording time within the storage section 33. The controller 30 continuously updates the number of people currently using the recording apparatus 11 as the recording progresses.

As illustrated in FIG. 14, the number of people currently using the recording apparatus 11 is calculated based on the second recording time. The values in the table illustrated in FIG. 14 are just examples and may be properly set. The time segments also may be properly set. A calculating formula that produces the number of people currently using the recording apparatus 11 may be used when the second recording time is assigned thereto. The shorter the second recording time, the more likely people are to immediately come to the recording apparatus 11 for media M to be outputted. The shorter the second recording time, therefore, the larger the value of the number of people may be set larger.

Calculation of Density in Each Output Tray Area

The controller 30 may divide a zone near the recording apparatus 11 into plural areas and calculate the density for each area. For example, the controller 30 may calculate densities for areas where the respective output trays are located. At the recording apparatus 11 illustrated in FIG. 1, some people congregate near the main section 12 including the first output tray 17 while some people congregate near the post-processing apparatus 90 including the second output tray 57. The people near the main section 12 and the people near the post-processing apparatus 90 have a low risk of infection due to contact or close proximity therebetween because the first output tray 17 and the second output tray 57 are distant from each other. The controller 30 may calculate both the density in the area where the first output tray 17 is located and the density in the area where the second output tray 57 is located. For example, the density in the area where the first output tray 17 is located is referred to as a first density near the recording apparatus 11, and the density in the area where the second output tray 57 is located is referred to as a second density near the recording apparatus 11.

The first density near the recording apparatus 11 is calculated based on information concerning the recording data with the media destination set to the first output tray 17 and the operation status of each component of the main section 12 including the first output tray 17. The second density near the recording apparatus 11 is calculated based on information concerning the recording data with the media destination set to the second output tray 57 and the operation status of each component of the post-processing apparatus 90 including the second output tray 57.

When the user operating a terminal 91 selects through the input section 91a, the recording apparatus 11 illustrated in FIG. 2 as the destination of the recording data, the recording apparatus 11 may transmit the density near the recording apparatus 11 to the terminal 91. In this process, the recording apparatus 11 may transmit to the terminal 91, the density in the area where each output tray of the recording apparatus 11 is located. That is, the user operating the terminal 91 may be notified of the first density near the recording apparatus 11 and the second density near the recording apparatus 11. The user can select one of the output trays as the media destination with reference to the values of the first and second densities.

When the user operating a terminal 91 selects through the input section 91a, the recording apparatus 11 illustrated in FIG. 2 as the destination of the recording data, the output tray located in the area with the lowest density among the areas where the respective output trays are located may be automatically selected as the media destination. That is, when the recording data are transmitted from the terminal 91 to the recording apparatus 11, the recording apparatus 11 may select as the media destination, the output tray located in the area with the lowest density from the areas where the respective output trays are located and output the media M to the selected output tray.

Operation of First Embodiment

The operations of the first embodiment will be described.

When the user operating a terminal 91 transmits recording data to the recording apparatus 11, the recording data are stored in the storage section 33. In this process, as information concerning the recording data, the terminal 91 from which the recording data were transmitted, the name of the user who transmitted the recording data, the date and time at which the recording data were transmitted, the output tray to which the media M are to be outputted, and the like are stored in the storage section 33 along with the recording data. In the storage section 33, recording data transmitted from plural users and information concerning the transmitted recording data are accumulated. Once recorded, the recording data are deleted from the storage section 33.

When the user having the IC card 92 among users who transmitted recording data brings the IC card 92 close to the authentication section 15a, the IC card 92 is authenticated. This enables operation at the operation section 15 to give a recording instruction to the recording apparatus 11 for the recording data transmitted before. The user with the IC card 92 authenticated operates the operation section 15 for recording on media M using the recording data transmitted by the user.

The recording data transmitted by a user who is currently out and the recording data of a user to be notified of the density are excluded from the recording data for use in calculation of the density. This improves the accuracy in calculating the number of people congregating to the recording apparatus 11 to record recording data.

The controller 30 causes the calculation section 37 to calculate the first elapsed time for each set of recording data stored in the storage section 33 from the date and time at which the set of recording data was transmitted and the current date and time. The calculation section 37 continuously updates the value of the first elapsed time over time.

The controller 30 calculates the number of people congregating to the recording apparatus 11 to record recording data, based on the first elapsed time as the elapsed time since the recording data were transmitted. The value of the density therefore is increased immediately after the recording data were transmitted. That is, the value of the density is increased when people are likely to congregate to the recording apparatus 11 to record recording data.

The controller 30 calculates the density based on the first recording time as the time required to record the recording data. The value of the density therefore is increased when the recording data takes a long time to record. That is, the value of the density is increased when people are likely to stay near the recording apparatus 11 to record recording data.

The user who does not have the IC card 92 among the users who transmitted recording data can cause the recording apparatus 11 to immediately perform recording on media M by making a recording instruction at the same time as transmitting the recording data from the terminal 91. Then, the recorded media M can be immediately outputted from the main section 12. For example, the recorded media M are outputted to the first output tray 17, and the media M outputted to the first output tray 17 are detected by the first detection section 17a.

The controller 30 excludes from the output trays for use in calculation, the output tray on which the media M have been outputted by the user who is currently out and the output tray to which the media M have been outputted by the user to be notified of the density. This improves the accuracy in calculating the number of people congregating to the recording apparatus 11 to bring back media M already outputted.

The controller 30 causes the calculation section 37 to calculate the second elapsed time for each output tray from the date and time at which the media M were outputted to the output tray and the current date and time. The calculation section 37 continuously updates the value of the second elapsed time over time.

The controller 30 causes the calculation section 37 to calculate the number of people congregating to the recording apparatus 11 to bring back media M already outputted, based on the detection results of the media M by the detection sections 17a, 57a, and 67a. The controller 30 causes the calculation section 37 to calculate the number of people congregating to the recording apparatus 11 to bring back media M already outputted, based on the second elapsed time as the elapsed time since the media M were outputted to the output tray 17, 57, or 67. The value of the density therefore is increased immediately after the media M were outputted to the output tray 17, 57, or 67 of the recording apparatus 11. That is, the value of the density is increased when people are likely to congregate to the recording apparatus 11 to bring back the media M already outputted.

The users operate the operation section 15 to cause the reading section 13 to read an image of an original placed in the automatic feeding section 14. The users also operate the operation section 15 to immediately copy an original placed in the automatic feeding section 14 on media M at the recording apparatus 11.

The controller 30 causes the calculation section 37 to calculate the number of people currently using the recording apparatus 11 based on whether each component of the recording apparatus 11 is operating. The value of the number of people currently using the recording apparatus 11 therefore is increased when any component of the recording apparatus 11 is operating.

The calculation section 37 adds up the number of people congregating to the recording apparatus 11 to record recording data, the number of people congregating to the recording apparatus 11 to bring back media M already outputted, and the number of people currently using the recording apparatus 11 to calculate the density near the recording apparatus 11.

When a user intends to transmit recording data from a terminal 91, the controller 30 notifies the terminal 91 of the current density. The user is thereby able to know the density near the recording apparatus 11. The controller 30 divides the zone near the recording apparatus 11 into plural areas and calculates the density in each area. The controller 30 notifies the terminal 91 of the calculated densities. The user thereby can avoid using the recording apparatus 11 in the area with high density.

Effect of First Embodiment

The effects of the first embodiment will be described.

The recording apparatus 11 of the first embodiment and the method of calculating the density near the recording apparatus 11 provide the following effects.

(1) When the index indicating the size of the value of the number of people predicted to congregate near the recording apparatus 11 is the density near the recording apparatus 11, the controller 30 calculates the density based on information concerning the recording data stored in the storage section 33. The controller 30 enables the calculated density to be referred to from users. By referring to the density near the recording apparatus 11, each user can determine whether to go to the recording apparatus 11 based on the value of the density, thus reducing contact or close proximity with other people near the recording apparatus 11.

(2) The information concerning the recording data includes information concerning the users who transmitted the recording data to be stored in the storage section 33. The density is calculated based on the information concerning the users who transmitted the recording data to be stored in the storage section 33. The users therefore can reduce contact or close proximity with people who are likely to come to the recording apparatus 11 for media M.

(3) The controller 30 selects recording data for use in calculation of the density based on the information concerning the users who transmitted the recording data. In the process of calculating the density based on the information concerning the recording data, the recording data from people who are unlikely to come to the recording apparatus 11 for media M are eliminated, thus improving the accuracy in calculating the density.

(4) The controller 30 calculates the density that can be referred to from each user, based on information concerning the recording data other than the recording data of the user. In the process of calculating the density for each user based on the information concerning recording data, the recording data transmitted by the user are eliminated, thus improving the accuracy in calculating the density.

(5) The controller 30 transmits the current density to a user when the user intends to transmit recording data. By being notified of the current density, the user who intends to perform recording at the recording apparatus 11 can determine whether to transmit the recording data to the recording apparatus 11 immediately. Furthermore, by being notified of the current density, the user can determine whether to immediately go to the recording apparatus 11 for recording on media M when transmitting the recording data.

(6) The information concerning the recording data includes the first elapsed time as the elapsed time since the recording data were transmitted. The users therefore can reduce contact or close proximity with people who come to the recording apparatus 11 to record recording data on media M immediately after transmitting the recording data to the recording apparatus 11.

(7) The information concerning the recording data includes the first recording time as the time required to record the recording data. The users therefore can reduce contact or close proximity with people who spend a long time recording the recording data on media M at the recording apparatus 11.

(8) The controller 30 calculates the density based on the number of sets of recording data stored in the storage section 33. The users therefore can use the recording apparatus 11 avoiding hours when the recording apparatus 11 is likely to be used many times.

(9) The controller 30 calculates the density based on the operation status of the operation section 15 which is operated to record the recording data stored in the storage section 33. The users therefore can reduce contact or close proximity with people who are operating the operation section 15 of the recording apparatus 11.

(10) The controller 30 calculates the density based on the detection results of media M by the detection section 17a, 57a, or 67a and the second elapsed time as the elapsed time since the media M were outputted to the output tray 17, 57, or 67. The users therefore can reduce contact or close proximity with people who immediately come for the media M on the output trays 17, 57, or 67 of the recording apparatus 11.

(11) The information concerning the recording data includes the second recording time as the time required to finish the recording that is being currently performed in the recording section 20. The users therefore can reduce contact or close proximity with people who come for media M that are to be outputted by recording being currently performed in the recording apparatus 11.

(12) The controller 30 divides the zone near the recording apparatus 11 into plural areas and calculates the density for each area. The users therefore can avoid using the recording apparatus 11 in the area with high density.

(13) The controller 30 calculates the densities for the respective areas where the output trays 17, 57, and 67 are located. The controller 30 thereby selects as the medium destination, the output tray located in the area with the lowest density among all the areas and outputs media M to the selected output tray. The users can therefore reduce contact or close proximity with people congregating near the recording apparatus 11 when coming to the output tray for the media M.

Second Embodiment

Hereinafter, a second embodiment will be described with reference to the drawings. The second embodiment is substantially the same as the first embodiment. The same components are given the same reference numerals, and the overlapping description is omitted.

In the second embodiment, the controller 30 calculates the density near the recording apparatus 11 based on a recording log stored in the memory section 36 and enables the calculated density to be referred to from a user. For example, the density near the recording apparatus 11 is calculated based on the previous day's recording log.

Method of Calculating Density

As illustrated in FIG. 15, the computer 40 of the controller 30 executes a procedure of the method of calculating the density near the recording apparatus 11. The procedure includes a step in which recording logs for use in calculation of the density near the recording apparatus 11 are selected and a step in which the density near the recording apparatus 11 is calculated based on the selected recording logs.

In step S1100, the controller 30 executes a subroutine to select recording logs for use in calculation of the density. This subroutine is a step in which recording logs are selected based on information concerning the users who transmitted the recording data in the recording logs and the time period when the recording data in the recording logs were recorded. When this subroutine ends, the controller 30 moves the processing to step S1200.

In step S1200, the controller 30 executes a subroutine to calculate the number of people congregating near the recording apparatus 11. In the second embodiment, the number of people congregating near the recording apparatus 11 is referred to as the density. This subroutine is a step in which the density near the recording apparatus 11 is calculated based on the selected recording logs. When this subroutine ends, the controller 30 terminates the procedure to calculate the density near the recording apparatus 11.

Figure 16:
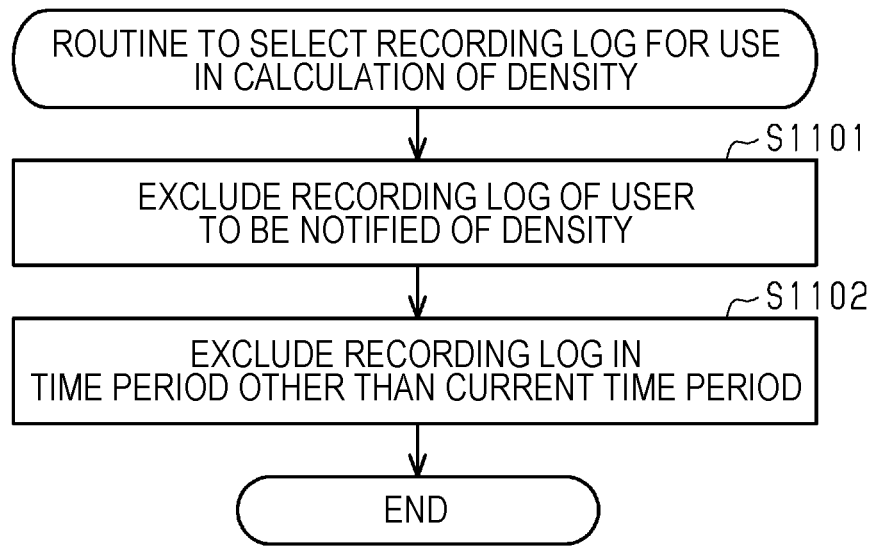
FIG. 16 is a subroutine illustrating a method of selecting recording logs for use in calculation of the number of people.

As illustrated in FIG. 16, the computer 40 of the controller 30 executes a subroutine to select recording logs for use in calculation of the density. The controller 30 selects the recording logs for use in calculation of the density based on information concerning the users who transmitted the recording data in the recording logs and the time period when the recording data in the recording logs were recorded.

In step S1101, the controller 30 excludes a recording log of the user to be notified of the density. That is, the recording logs other than the recording log of the user to be notified of the density are selected. This step is a step in which recording logs are selected based on the information concerning the users who transmitted the recording data in the recording logs. When the processing in step S1101 ends, the controller 30 moves to processing in step S1102.

In step S1102, recording logs in a time period other than a predetermined time period are excluded. For example, each day is divided into 24 time periods of one hour. For example, when the current time is 9:30, the current time falls in a time period of 9 to 10 o'clock. The time segments may be properly set. In the process of calculating the density in the current time period, recording logs are selected in which the time period when recording data were recorded corresponds to the time period including the current time. The time period when the recording data were recorded is included in recording logs. This step is a step in which recording logs are selected based on the time period when the recording data in the recording logs were recorded. When the processing in step S1102 ends, the controller 30 terminates this subroutine.

Figure 17:
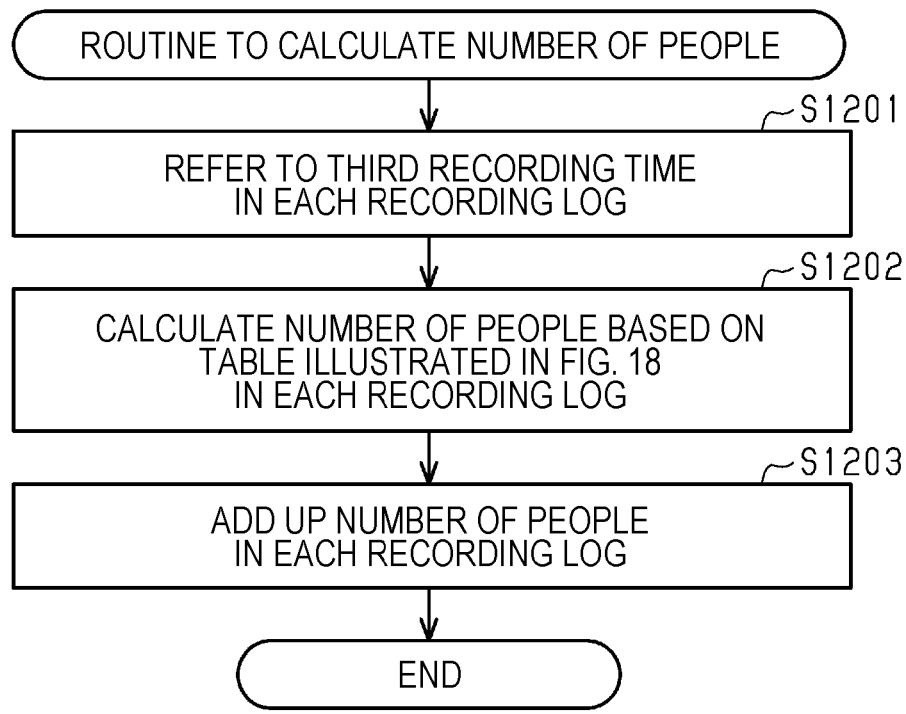
FIG. 17 is a subroutine illustrating a method of calculating the number of people.

As illustrated in FIG. 17, the computer 40 of the controller 30 executes a subroutine to calculate the density. The controller 30 causes the calculation section 37 to predict the number of people congregating near the recording apparatus 11 for each recording log selected in the subroutine illustrated in FIG. 16 and add up the predicted number of people for each recording log to calculate the density near the recording apparatus 11. This subroutine is a step in which the density is calculated based on the selected recording logs.

In step S1201, the controller 30 refers to a third recording time in each of the selected recording logs. The third recording time is included in recording logs. When the processing in step S1201 ends, the controller 30 moves to processing in step S1202.

In step S1202, the controller 30 causes the calculation section 37 to calculate the number of people congregating near the recording apparatus 11 for each recording log in accordance with a number-of-people table based on the third recording time. The table illustrated in FIG. 18 is an example of the number-of-people table based on the third recording time. When the processing in step S1202 ends, the controller 30 moves to processing in step S1203.

In step S1203, the controller 30 adds up the number of people congregating near the recording apparatus 11 for each recording log. The resultant value is the density near the recording apparatus 11 as the index indicating the size of the value of the number of people congregating near the recording apparatus 11. That is, the controller 30 calculates the density near the recording apparatus 11 based on the third recording time in the recording logs with the time period corresponding to the time period including the current time. The controller 30 may calculate the density near the recording apparatus 11 based on the third recording time in the recording logs with the time period corresponding to a predetermined time period.

As illustrated in FIG. 18, the number of people congregating near the recording apparatus 11 in recording logs is calculated based on the third recording time. The values in the table illustrated in FIG. 18 are just examples and may be properly set. The time segments also may be properly set. The number of people congregating in recording logs may be calculated using a calculating formula that produces the density when the third recording time is assigned thereto.

The longer the third recording time, the longer the people stayed near the recording apparatus 11 to record the recording data. The longer the third recording time, the larger the value of the number of people therefore may be set.

As illustrated in FIG. 19, the density near the recording apparatus 11 may be calculated based on the number of recordings in the selected recording logs instead of the third recording time. That is, the controller 30 may calculate the density based on the number of recordings in the recording logs with the time period corresponding to the current time period. The controller 30 may calculate the density near the recording apparatus 11 in a predetermined time period based on the number of recordings in the recording logs with the time period corresponding to the predetermined time period. The values in the table illustrated in FIG. 19 are just examples and may be properly set. The density near the recording apparatus 11 may be calculated based on the number of users in the selected recording logs.

The controller 30 may calculate the density near the recording apparatus 11 in a predetermined time period. The controller 30 may calculate the density near the recording apparatus 11 for each time period. For example, each day may be divided into 24 time periods, and the density near the recording apparatus 11 may be calculated for each of the 24 time periods. The controller 30 may enable the density near the recording apparatus 11 for each time period to be referred to from users.

Operation of Second Embodiment

The operation of the second embodiment will be described.

The controller 30 causes the calculation section 37 to calculate the density from recording logs. The controller 30 first excludes from the recording logs to be used in calculation, recording logs of a user to be notified of the density and recording logs in the time periods other than the current time period. This improves the accuracy in calculating the density.

Next, the controller 30 calculates the density based on the third recording time for each recording log. The value of the density therefore can be increased when the recording data took a long time to record. That is, the value of the density can be increased when people are likely to congregate near the recording apparatus 11 to record recording data.

When a user intends to transmit recording data from a terminal 91, the controller 30 notifies the terminal 91 of the current density. The user is thereby able to know the density near the recording apparatus 11. The controller 30 calculates the density for each time period and then notifies the terminal 91 of the calculated densities. The user therefore can avoid using the recording apparatus 11 in a time period with high density.

Effect of Second Embodiment

The effects of the second embodiment will be described.

(14) When the index indicating the size of the value of the number of people predicted to congregate near the recording apparatus 11 is referred to as the density near the recording apparatus 11, the controller 30 calculates the density based on the recording logs stored in the memory section 36. The controller 30 enables the calculated density to be referred to from users. By referring to the density near the recording apparatus 11, the users can determine whether to go to the recording apparatus 11. The users can therefore reduce contact or close proximity with people congregating near the recording apparatus 11.

(15) The controller 30 calculates the density for each of the time periods when the recording data in the recording logs were recorded. By referring to the calculated density near the recording apparatus 11 for each time period, the users can change the time period when the users are going to the recording apparatus 11. The users therefore can reduce contact or close proximity with people congregating near the recording apparatus 11.

(16) The controller 30 calculates the density in a predetermined time period based on the third recording time in the recording logs in which the time period when the recording data were recorded corresponds to the predetermined time period. The users therefore can use the recording apparatus 11 avoiding the time period when the recording apparatus 11 is likely to be used in recording for a long time.

(17) The controller 30 calculates the density in a predetermined time period based on the number of recordings in the recording logs in which the time period when the recording data were recorded corresponds to the predetermined time period. The users therefore can use the recording apparatus 11 avoiding the time period when the recording apparatus 11 is likely to be used many times.

Modification of Embodiment

The first and second embodiments may be modified and implemented as follows. The first and second embodiments and the following modifications can be combined without departing from technical consistency.

The recording method on media M in the recording apparatus 11 is not limited to the ink jet method. For example, the recording apparatus 11 may be an electrophotographic or thermal transfer-type recording apparatus.

The recording apparatus 11 may include a sensing section configured to detect that the medium accommodation sections 16 are drawn out. The controller 30 may calculate the density near the recording apparatus 11 based on the detection result by the sensing section.

The recording apparatus 11 may include a human detection sensor configured to detect the presence of people near the recording apparatus 11. The controller 30 may calculate the density near the recording apparatus 11 based on the output result of the human detection sensor.

The recording apparatus 11 may calculate the density near the recording apparatus 11 based on the authentication status of the authentication section 15a. For example, when a user has been authenticated by the authentication section 15a, the controller 30 may determine that the user is currently using the recording apparatus 11.

The distance from each terminal 91 to the recording apparatus 11 may be registered in the recording apparatus 11. The controller 30 may estimate the density reflecting the time for the user using the terminal 91 to reach the recording apparatus 11 and notify the user using the terminal 91 of the estimated density.

There is a case that media M of a user are outputted to an output tray on which media M of another user are already outputted. When the detection sections 17a, 57a, and 67a are sensors configured to detect the presence of media M, the detection sections 17a, 57a, and 67a cannot determine which user's media M are left. The second elapsed time therefore may be an elapsed time since the last medium M was outputted to the output tray.

When a user is transmitting plural sets of recording data to the recording apparatus 11, the controller 30 may calculate the number of people based on the information concerning the second or subsequent set of recording data of the user. In such a case, the controller 30 may set smaller the value of the number of people.

The controller 30 may calculate densities for several days from daily recording logs. The controller 30 may take the average of the calculated densities. The controller 30 may use the average as the density near the recording apparatus 11.

In the second embodiment, the time period is not limited to being on an hourly basis and may be on a thirty- or ten-minute basis. Alternatively, the time period may be on a two-hourly basis.

The users may refer to the density by audio guidance of the terminals 91.

Technical Idea Understood from Embodiment and Modification and Operation Effect Thereof Hereinafter, the technical idea understood from the aforementioned embodiments and modifications and the operation effects thereof will be described.

(A) A recording apparatus includes: a receiver receiving sets of recording data transmitted from users; a recording section performing a recording on a medium using each set of recording data; a storage section temporarily storing the sets of recording data until the respective recordings are finished; an output tray to which the medium with the recording finished is outputted; and a controller controlling the recording apparatus. Here, when an index indicating the size of a value of the number of people predicted to congregate near the recording apparatus is a density near the recording apparatus, the controller calculates, based on information concerning the sets of recording data stored in the storage section, the density and enables the density to be referred to.

According to this configuration, by referring to the density near the recording apparatus, the users can determine, based on the value of the density, whether to go to the recording apparatus. The users therefore can reduce contact or close proximity with people congregating near the recording apparatus.

(B) In the above-described recording apparatus, the information concerning the sets of recording data may include information concerning the users who transmitted the sets of recording data to be stored in the storage section.

According to this configuration, the density is calculated based on the information concerning the users who transmitted recording data to be stored in the storage section. The users therefore can reduce contact or close proximity with people who are likely to come to the recording apparatus for media.

(C) In the above-described recording apparatus, the controller may select, based on information concerning the users who transmitted the sets of recording data, the sets of recording data for use in the calculation of the density.

According to this configuration, in the process of calculating, based on the information concerning the recording data, the density, the recording data of people who are unlikely to come to the recording apparatus for media are excluded. This can improve the accuracy in calculating the density.

(D) In the above-described recording apparatus, the controller may calculate, based on information concerning the sets of recording data other than the set of recording data of the user, the density enabled to be referred to from each user.

According to this configuration, in the process of calculating, based on the information concerning the recording data, the density for each user, the recording data transmitted by the user is excluded. This can improve the accuracy in calculating the density.

(E) In the above-described recording apparatus, the recording apparatus may be configured to detect that the users intend to transmit the sets of recording data to the recording apparatus, the recording apparatus may further include a transmitter transmitting information concerning the recording apparatus, and the controller may transmit a current value of the density to the users who intend to transmit the recording data.

According to this configuration, by being notified of the current density, the users who intend to perform recording in the recording apparatus can determine whether to immediately transmit recording data to the recording apparatus. By being notified of the current density, furthermore, the users can determine whether to immediately go to the recording apparatus to record recording data on media when transmitting the recording data.

(F) In the above-described recording apparatus, the information concerning each set of recording data may include a first elapsed time which is an elapsed time since the set of recording data was transmitted.

According to this configuration, the users can reduce contact or close proximity with people who come to the recording apparatus to record recording data on media M immediately after transmitting the recording data to the recording apparatus.

(G) In the above-described recording apparatus, the recording apparatus may further include: a first prediction section configured to predict a first recording time which is a time required to record each set of recording data, and the information concerning the set of recording data may include the first recording time.

According to this configuration, the users can reduce contact or close proximity with people who spend a long time recording the recording data on media at the recording apparatus.

(H) In the above-described recording apparatus, the controller may calculate, based on the number of sets of recording data stored in the storage section, the density.

According to this configuration, the users can use the recording apparatus avoiding hours when the recording apparatus is likely to be used many times.

(I) In the above-described recording apparatus, the recording apparatus may further include: an operation section operated to record the sets of recording data stored in the storage section, and the controller may calculate, based on the operation status of the operation section, the density.

According to this configuration, the users can reduce contact or close proximity with people who are operating the operation section of the recording apparatus.

(J) In the above-described recording apparatus, the recording apparatus may further include: a detection section detecting the medium on the output tray, and the controller may calculate, based on a detection result of the medium by the detection section and a second elapsed time which is an elapsed time since the medium was outputted to the output tray, the density.

According to this configuration, the users can reduce contact or close proximity with people who immediately come for media outputted at the output trays of the recording apparatus.

(K) In the above-described recording apparatus, the recording apparatus may further include: a second prediction section predicting a second recording time which is a time required to finish recording being performed in the recording section, and the information concerning each set of recording data may include the second recording time.

According to this configuration, the users can reduce contact or close proximity with people who come for media that will be outputted by recording being currently performed in the recording apparatus.

(L) A recording apparatus includes: a receiver receiving sets of recording data transmitted from users; a recording section performing a recording on a medium using each set of recording data; a memory section storing a recording log of the recording section; an output tray to which the medium with the recording finished is outputted; and a controller controlling the recording apparatus. Here, when an index indicating the size of a value of the number of people predicted to congregate near the recording apparatus is a density near the recording apparatus, the controller calculates, the recording log stored in the memory section, the density based on and enables the density to be referred to.

According to this configuration, by referring to the density near the recording apparatus, the users can determine whether to go to the recording apparatus. The users therefore can reduce contact or close proximity with people congregating near the recording apparatus.

(M) In the above-described recording apparatus, the recording log may include a time period when each set of recording data was recorded, and the controller may calculate the density for each time period.

According to this configuration, by referring to the density near the recording apparatus for each time period, the users can change the time period when the users got to the recording apparatus. The users therefore can reduce contact or close proximity with people congregating near the recording apparatus.

(N) In the above-described recording apparatus, the recording log may include a third recording time which is a time required to record each set of recording data, and the controller may calculate, based on the third recording time included in the recording log when the time period included in the recording log corresponds to the predetermined time period, the density in a predetermined time period.

According to this configuration, the users can use the recording apparatus avoiding the time periods when the recording apparatus is likely to be used in recording for a long time.

(O) In the above-described recording apparatus, the controller may calculate, based on the number of recordings in the recording log when the time period included in the recording log corresponds to the predetermined time period, the density in a predetermined time period.

According to this configuration, the users can use the recording apparatus avoiding the time periods when the recording apparatus is likely to be used many times.

(P) In the above-described recording apparatus, the controller may divide a zone near the recording apparatus into plural areas and calculate the density for each of the plural areas.

According to this configuration, the users can avoid using the recording apparatus in an area with high density.

(Q) In the above-described recording apparatus, a number of the output tray may be two or more, the output trays may be located in the respective plural areas, and the controller may calculate the density for the respective plural areas, select the tray corresponding to the lowest density among the calculated densities, and output the medium to the selected tray.

According to this configuration, users can reduce contact or close proximity with people congregating near the recording apparatus when going to the output trays for media.

(R) A method of calculating a density near a recording apparatus includes: a receiver receiving sets of recording data transmitted from users; a recording section performing a recording on a medium using each set of recording data; a storage section temporarily storing the sets of recording data until the respective recordings are finished; an output tray to which the medium with the recording finished is outputted; and a computer calculating a density near the recording apparatus when an index indicating the size of a value of the number of people predicted to congregate near the recording apparatus is the density, the method including: causing, based on information concerning the users who transmitted the sets of recording data, the computer to select the sets of recording data; and causing, based on the information concerning the selected sets of recording data, the computer to calculate the density.

According to this method, the users can determine whether to go to the recording apparatus by referring to the value of the calculated density. The users therefore can reduce contact or close proximity with people congregating near the recording apparatus.

(S) A method of calculating a density near a recording apparatus includes: a receiver receiving sets of recording data transmitted from users; a recording section performing a recording on a medium using each set of recording data; a memory section storing a recording log of the recording section; an output tray to which the medium with the recording finished is outputted; and a computer calculating a density near the recording apparatus when an index indicating the size of a value of the number of people predicted to congregate near the recording apparatus is the density, the method including: causing, based on a time period in the recording log when each set of recording data was recorded, the computer to select the recording log; and causing, based on the selected recording log, the computer to calculate the density.

According to this method, the users can change the time period when the users go to the recording apparatus, by referring to the value of the calculated density. The users therefore can reduce contact or close proximity with people congregating near the recording apparatus.

What is claimed is:

1. A recording apparatus, comprising:
a receiver receiving recording data transmitted from a user;
a recording section performing recording on a medium using the recording data;
a storage section temporarily storing the recording data until the recording is finished;
an output tray to which the medium with the recording finished is outputted; and
a processor controlling the recording apparatus, wherein
a density of an area near the recording apparatus is a probability indicating a size of a value of a number of users predicted to congregate near the recording apparatus, and
the processor calculates the density based on information concerning recording data stored in the storage section and a first elapsed time, which is an elapsed time since the recording data were transmitted, and enables the density to be accessible via a display.

2. The recording apparatus according to claim 1, wherein the information concerning recording data includes information concerning a user who transmitted recording data to be stored in the storage section.

3. The recording apparatus according to claim 1, wherein the processor selects recording data for use in calculating the density, based on information concerning a user who transmitted the recording data.

4. The recording apparatus according to claim 1, wherein the processor calculates the density, which is accessible by a user, based on information concerning recording data other than recording data of the user.

5. The recording apparatus according to claim 1, wherein the recording apparatus is configured to detect that the user intends to transmit the recording data to the recording apparatus,
the recording apparatus further comprising a transmitter transmitting information concerning the recording apparatus, wherein
the processor transmits a current value of the density to the user who intends to transmit the recording data.

6. The recording apparatus according to claim 1, further comprising
a first prediction section configured to predict a first recording time which is a time required to record recording data, wherein
the information concerning recording data includes the first recording time.

7. The recording apparatus according to claim 1, wherein the processor calculates the density based on the number of sets of recording data stored in the storage section.

8. The recording apparatus according to claim 1, further comprising
an operation section operated to record the recording data stored in the storage section, wherein
the processor calculates the density based on an operation status of the operation section.

9. The recording apparatus according to claim 1, further comprising
a detection section detecting the medium on the output tray, wherein
the processor calculates the density based on a detection result of the medium by the detection section and a second elapsed time which is an elapsed time since the medium was outputted to the output tray.

10. The recording apparatus according to claim 1, further comprising
a second prediction section predicting a second recording time which is a time required to finish recording being performed in the recording section, wherein
the information concerning recording data includes the second recording time.

11. The recording apparatus according to claim 1, wherein the processor divides a zone near the recording apparatus into plural areas and calculates the density for each of the plural areas.

12. The recording apparatus according to claim 11, wherein
the output tray includes output trays,
the output trays are located in the respective plural areas, and
the processor calculates the density for each of the plural areas, selects an output tray located in one of the plural areas with the lowest density, and outputs the medium to the output tray selected.

13. A recording apparatus, comprising:
a receiver receiving recording data transmitted from a user;
a recording section performing recording on a medium using the recording data;
a memory section storing a recording log of the recording section;
an output tray to which the medium with the recording finished is outputted; and
a processor controlling the recording apparatus, wherein
a density in a vicinity of the recording apparatus is a probability indicating a size of a value of a number of users predicted to congregate near the recording apparatus, the processor calculates the density based on the recording log stored in the memory section and a first elapsed time, which is an elapsed time since the recording data were transmitted, and enables the density to be accessible via a display.

14. The recording apparatus according to claim 13, wherein the recording log includes a time period when recording data was recorded, and the processor calculates the density for each time period.

15. The recording apparatus according to claim 14, wherein the recording log includes a third recording time which is a time required to record recording data, and the processor calculates the density based on the third recording time included in the recording log when the time period included in the recording log corresponds to a predetermined time period, the density in the predetermined time period.

16. The recording apparatus according to claim 14, wherein the processor calculates the density based on the number of recordings in the recording log when the time period included in the recording log corresponds to a predetermined time period, the density in the predetermined time period.

17. A method of calculating a density near a recording apparatus including a receiver receiving recording data transmitted from a user, a recording section performing recording on a medium using the recording data, a storage section temporarily storing the recording data until the recording is finished, an output tray to which the medium with the recording finished is outputted, and a computer calculating a density near the recording apparatus, where the density is a probability indicating a size of a value of a number of users predicted to congregate near the recording apparatus, the method comprising:

causing the computer to select recording data, based on information concerning a user who transmitted the recording data; and causing the computer to calculate, based on information concerning the recording data selected and a first elapsed time, which is an elapsed time since the recording data were transmitted, the density.

18. A method of calculating a density near a recording apparatus including a receiver receiving recording data transmitted from a user, a recording section performing recording on a medium using the recording data, a memory section storing a recording log of the recording section, an output tray to which the medium with the recording finished is outputted, and a computer calculating a density near the recording apparatus, where the density is a probability indicating a size of a value of a number of users predicted to congregate near the recording apparatus is the density, the method comprising:

causing the computer to select a recording log, based on a time period in the recording log when recording data was recorded; and causing the computer to calculate the density based on the recording log selected and a first elapsed time, which is an elapsed time since the recording data were transmitted.

* * * * *